United States Patent [19]

Ukai et al.

[11] Patent Number: 4,510,235
[45] Date of Patent: Apr. 9, 1985

[54] SILVER HALIDE PHOTOGRAPHIC EMULSIONS

[75] Inventors: Toshinao Ukai; Masaki Okazaki; Haruo Takei; Ichizo Toya; Sadanobu Syuto, all of Kanagawa, Japan

[73] Assignee: Fuji Photo Film Co., Ltd., Kanagawa, Japan

[21] Appl. No.: 604,184

[22] Filed: Apr. 26, 1984

[30] Foreign Application Priority Data

Apr. 28, 1983 [JP] Japan .................................. 58-75401
Nov. 28, 1983 [JP] Japan ................................ 58-223874

[51] Int. Cl.³ ............................................... G03C 1/02
[52] U.S. Cl. .................................... 430/574; 430/217; 430/505; 430/550; 430/588; 430/598
[58] Field of Search ............... 430/574, 588, 505, 598, 430/550, 217

[56] References Cited

U.S. PATENT DOCUMENTS

| 3,814,609 | 6/1974 | Shiba et al. | 430/574 |
| 3,873,324 | 3/1975 | Hinata et al. | 430/574 |
| 3,947,275 | 3/1976 | Shiba et al. | 430/574 |
| 4,010,037 | 3/1977 | Hinata et al. | 430/574 |
| 4,179,296 | 12/1979 | Sato et al. | 430/574 |

OTHER PUBLICATIONS

Troitskaya et al., Chemical Abstracts, vol. 79, Item 54858k, 1973.

Primary Examiner—J. Travis Brown
Attorney, Agent, or Firm—Sughrue, Mion, Zinn, Macpeak, and Seas

[57] ABSTRACT

A silver halide photographic emulsion containing a particular combination of dyes is described which prevents aggravated fogging of the emulsion under the influence of high temperature or the combination of high temperature and high humidity, and minimizes the degradation of sensitivity of the emulsion thus providing an emulsion of high stability to withstand the adverse effects of aging.

21 Claims, No Drawings

SILVER HALIDE PHOTOGRAPHIC EMULSIONS

FIELD OF THE INVENTION

This invention relates to silver halide photographic emulsions and, particularly, to silver halide photographic emulsions spectrally sensitized with at least two sensitizing dyes mutually exhibiting supersensitizing activities. More particularly, this invention relates to silver halide photographic emulsions having spectral sensitivity enhanced particularly in the green wavelength region.

BACKGROUND OF THE INVENTION

It is known that addition of certain kinds of cyanine dyes is highly effective in enhancing the sensitivity of silver halide photographic emulsions. In such a case, the cyanine dye added to the silver halide photographic emulsion is adsorbed by the silver particles in the emulsion to add an absorption band of greater wavelength to the absorption band which is inherent in the silver halide. This phenomenon is called "spectral sensitization". It is also known that the efficiency of color sensitization by this dye may be notably enhanced when the dye is used in the presence of a second, certain kind of specifically selected dye or other organic substance and that a selective combination of certain types of dyes provides superadditively high sensitivity. This effect is called "supersensitization". Generally, combined use of two or more dyes more often than not fails to improve sensitivity or even results in loss of sensitivity. Therefore, supersensitization is a specific phenomenon depending on very specific combinations of compounds.

The maximum luminosity (maximum visibility) of man is about 545 nm. From the fact that the human eyes are acutely sensitive to light in the green wavelength region, it is inferred that the technique for sensitizing the green wavelength region is particularly significant in the whole technique for spectral sensitization. The term "luminosity" in a certain wavelength means a reciprocal of quantity of radiation having the wavelength required for providing a certain lightness.

Addition of a certain type of benzimidazolocarbocyanine dye is an unusually effective means of enhancing the sensitivity of silver halide to green light. This fact is described, e.g., in U.S. Pat. Nos. 2,739,149 and 2,912,329 and in British Pat. Nos. 654,690 and 815,172. The conventional benzimidazolocarbocyanine dye often fails to provide sufficient sensitization when it is used by itself. Several techniques involving combined use of the benzimidazolocarbocyanine dye with certain other dye with a view to the effect of supersensitization have been reported to the art. Descriptions dealing with such techniques are found, for example, in U.S. Pat. No. 3,506,443, Japanese Patent Publication No. 4936/68 and Japanese Patent Application (OPI) No. 82416/77 (the term "OPI" as used herein refers to a "published unexamined Japanese patent application").

Supersensitized emulsions using the conventionally known benzimidazolocarbocyanine dye, however, have suffered aggravated fog of the applied emulsion upon exposure to high temperature or to the combination of high temperature and high humidity or degraded stability of the applied emulsion to withstand effects of aging, with resultant extensive loss of sensitivity of the emulsion.

Improvements directed to overcoming the drawbacks suffered by supersensitized emulsions using the benzimidazolocarbocianine dye, namely, the aggravated fog of the applied emulsion under the influence of high temperature or the combination of high temperature and high humidity and the gradual degradation of sensitivity of the emulsion under the influence of aging, therefore, have constituted one of the important problems to be solved in techniques for the production of lightsensitive materials.

SUMMARY OF THE INVENTION

An object of this invention is to provide silver halide photographic emulsions which prevent the aggravated fog of the emulsion under the influence of high temperature or the combination of high temperature and high humidity, minimize the degradation of sensitivity of the emulsion upon aging, and enjoy high stability to withstand the adverse effects of aging.

It has now been found that the aforementioned object and other various objects of the present invention are accomplished by the preparation of a silver halide photographic emulsion, characterized by containing therein at least one benzimidazolocarbocyanine dye having a fluorine-substituted alkyl group of the formula $-CH_2(CF_2)_{m_1}H$ (wherein $m_1$ is an integer having a value of 1 to 8), bound to at least one of the nitrogen atoms of an imidazole ring as shown by the following formula (I) and the benzimidazolocarbocyanine dyes having a fluorine-substituted alkyl group of the formula $-(CH_2)_{l_2}(CF_2)_{m_2}F$ (wherein $l_2$ and $m_2$ each is 0 or an integer having a value of 1 to 8, providing that the total value of $l_2$ and $m_2$ is an integer greater than 0), bound to at least one of the nitrogen atoms of an imidazole ring as shown by the following formula (II), in combination with at least one dye represented by the following formulae (III) and (IV).

The compounds of formula (I) are represented by:

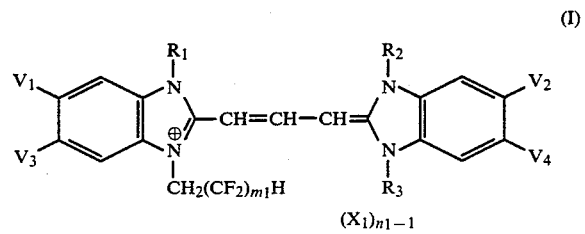

(I)

wherein $m_1$ is an integer having a value of 1 to 8, $R_1$, $R_2$ and $R_3$, which may be identical with or different from one another, independently represent a $-CH_2(CF_2)_{l_1}H$ group or a substituted or unsubstituted alkyl group, providing that at least one of $R_1$, $R_2$ and $R_3$ possesses an acid substituent (such as, for example, a sulfonic acid group or carboxylic acid group), $l_1$, which may be equal to or not equal to $m_1$, is an integer having a value of 1 to 8, $V_1$, $V_2$, $V_3$ and $V_4$, which may be identical with or different from one another, independently represent a hydrogen atom, a halogen atom, a substituted alkyl group, an unsubstituted alkyl group, an alkoxy group, an acyl group, an acyloxy group, an alkoxycarbonyl group, a carbamoyl group, a sulfamoyl group, a cyano group, or a trifluoromethyl group, $X_1$ represents an anion, and $n_1$ is 1 or 2, providing that $n_1$ is 1 where the dye forms an intramolecular salt.

The compounds of formula (II) are represented by:

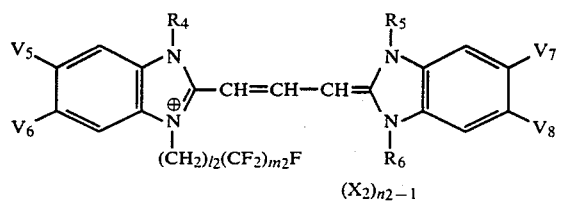

wherein $l_2$ is 0 or an integer having a value of 1 to 8, $m_2$ is 0 or an integer having a value of 1 to 8, providing that the total value of $l_2$ and $m_2$ is an integer greater than 0, $R_4$, $R_5$ and $R_6$, which may be identical with or different from one another, independently represent a $-(CH_2)_j(CF_2)_kF$ group or a substituted or unsubstituted alkyl group, providing that at least one of $R_4$, $R_5$ and $R_6$ represents an alkyl group containing an acid substituent (such as, for example, a sulfonic acid group or carboxylic acid group), j is 0 or an integer having a value of 1 to 8, k is 0 or an integer having a value of 1 to 8, providing that the total value of j and k is an integer greater than 0, $V_5$, $V_6$, $V_7$ and $V_8$, which may be identical with or different from one another, independently represent a hydrogen atom, a halogen atom, a substituted alkyl group, an unsubstituted alkyl group, an alkoxy group, an acyl group, an acyloxy group, an alkoxycarbonyl group, a carbamoyl group, a sulfamoyl group, a cyano group, or a trifluoromethyl group, $X_2$ represents an anion, and $n_2$ is 1 or 2, providing that $n_2$ is 1 where the dye forms an intramolecular salt.

The compounds of formula (III) are represented by:

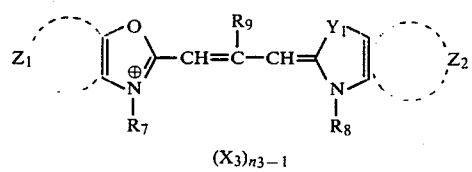

wherein $Y_1$ represents an oxygen atom, a sulfur atom, a selenium atom, or $N-R_{10}$, $Z_1$ and $Z_2$, which may be identical with or different from each other, independently represent an atomic group necessary for the formation of an unsubstituted or substituted benzene ring or naphthalene ring, $R_7$, $R_8$ and $R_{10}$ independently represent an unsubstituted or substituted alkyl group, providing that at least one of $R_7$, $R_8$ and $R_{10}$ possesses an acid substituent, $R_9$ represents a hydrogen atom, an alkyl group, or an aralkyl group, $X_3$ represents an anion, and $n_3$ is 1 or 2, providing that $n_3$ is 1 where the dye forms an intramolecular salt.

The compounds of formula (IV) are represented by:

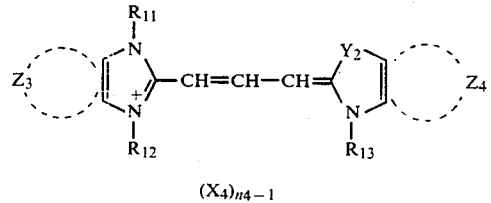

wherein $Y_2$ represents a sulfur atom, a selenium atom, or $N-R_{14}$, $Z_3$ and $Z_4$, which may be identical with or different from each other, independently represent an atomic group necessary for the formation of an unsubstituted or substituted benzene ring or naphthalene ring, $R_{11}$, $R_{12}$, $R_{13}$ and $R_{14}$ independently represent an unsubstituted or substituted alkyl group, providing that at least one of $R_{11}$, $R_{12}$, $R_{13}$ and $R_{14}$ possesses an acid substituent, $X_4$ represents an anion, and $n_4$ is 1 or 2, providing that $n_4$ is 1 where the dye forms an intramolecular salt.

In the sensitizing dyes of formula (I), the substituents indicated hereinbelow are preferred among the possible substituents. Specifically, in the case of $R_1$, $R_2$ and $R_3$, which may be identical with or different from one another, preferred substituents include $-CH_2(CF_2)_{l_1}H$ groups (wherein $l_1$, which may be equal or not equal to $m_1$, is an integer having a value of 1 to 8), unsaturated alkyl groups having not more than 6 carbon atoms (such as, for example, a methyl group, an ethyl group, a propyl group, a butyl group, a pentyl group, a vinylmethyl group, and a cyclohexyl group), and substituted alkyl groups [such as, for example, alkyl groups of not more than 6 carbon atoms which have, as substituents therefor, a carboxy group, a sulfo group, a cyano group, halogen atoms (such as, for example, a fluorine atom, a chlorine atom, and a bromine atom, providing that when the substitution involves a fluorine atom, those groups embraced in $-CH_2(CF_2)_{m_1}H$ and $-CH_2(CF_2)_{l_1}H$ are not included), a hydroxy group, alkoxycarbonyl groups having not more than 8 carbon atoms (such as, for example, a methoxycarbonyl group, an ethoxycarbonyl group, a phenoxycarbonyl group and a benzyloxycarbonyl group), alkoxy groups of not more than 8 carbon atoms (such as, for example, a methoxy group, an ethoxy group, a benzyloxy group and a phenethyloxy group), monocyclic aryloxy groups of not more than 10 carbon atoms (such as, for example, a phenoxy group and a p-tolyloxy group), acyloxy groups of not more than 3 carbon atoms (such as, for example, an acetyloxy group and a propionyloxy group), acyl groups of not more than 8 carbon atoms (such as, for example, an acetyl group, a propionyl group, a benzoyl group and a mesyl group), carbamoyl groups (such as, for example, a carbamoyl group, an N,N-dimethylcarbamoyl group, a morpholinocarbonyl group and a piperidinocarbonyl group), sulfamoyl groups (such as, for example, a sulfamoyl group, an N,N-dimethylsulfamoyl group, a morpholinosulfonyl group and a piperidinosulfonyl group), and aryl groups of not more than 10 carbon atoms (such as, for example, a phenyl group, a p-hydroxyphenyl group, a p-carboxyphenyl group, a p-sulfophenyl group and an α-naphthyl group)].

In the case of $V_1$, $V_2$, $V_3$ and $V_4$, which may be identical with or different from one another, preferred substituents include a hydrogen atom, halogen atoms (such as, for example, a fluorine atom, a chlorine atom and a bromine atom), alkyl groups of not more than 6 carbon atoms (such as, for example, a methyl group, an ethyl group, a vinylmethyl group and a cyclohexyl group), acyl groups of not more than 8 carbon atoms (such as, for example, an acetyl group, a propionyl group, a benzoyl group and a mesyl group), acyloxy groups of not more than 3 carbon atoms (such as, for example, an acetoxy group), alkoxycarbonyl groups of not more than 8 carbon atoms (such as, for example, a methoxycarbonyl group, an ethoxycarbonyl group and a benzyloxycarbonyl group), carbamoyl groups of not more than 8 carbon atoms (such as, for example, a carbamoyl group, an N,N-dimethylcarbamoyl group, a morpholinocarbamoyl group and a piperidinocarbonyl group), sulfamoyl groups of not more than 8 carbon atoms (such as, for example, a sulfamoyl group, an N,N-dimethylsulfamoyl group, a morpholinosulfonyl group and a piperidinosulfonyl group), a cyano group, a trifluoromethyl group and a hydroxy group.

In the sensitizing dyes of the formula (I) usable for the present invention, the substituents indicated hereinbelow are particularly preferred among the possible substituents. Specifically, in the case of $R_1$, $R_2$ and $R_3$, which may be identical with or different from one another, particularly preferred substituents include —$CH_2(CF_2)_{l_1}H$ groups (wherein $l_1$, which may be equal or not equal to $m_1$, is an integer having a value of 1 to 8), unsaturated alkyl groups of not more than 6 carbon atoms (such as, for example, a methyl group, an ethyl group, a propyl group, a butyl group, a pentyl group, a vinylmethyl group and a cyclohexyl group), and substituted alkyl groups of not more than 12 carbon atoms [such as, for example, alkyl groups of not more than 6 carbon atoms which have, as substituents therefor, a carboxy group, a sulfo group, a cyano group, halogen atoms (providing that when the substitution involves a fluorine atom, those groups embraced in —$CH_2(CF_2)_{m_1}H$ and —$CH_2(CF_2)_{l_1}H$ are not included), a hydroxy group, alkoxycarbonyl groups of not more than 6 carbon atoms, alkoxy groups of not more than 6 carbon atoms, monocyclic aryloxy groups of not more than 10 carbon atoms, acyloxy groups of not more than 3 carbon atoms, acyl groups of not more than 8 carbon atoms, sulfamoyl groups, and aryl groups of not more than 10 carbon atoms]. In the case of $V_1$, $V_2$, $V_3$ and $V_4$, which may be identical with or different from one another, particularly preferred substituents include a hydrogen atom, halogen atoms (such as, for example, a chlorine atom), alkyl groups of not more than 4 carbon atoms (such as, for example, a methyl group, an ethyl group and a vinylmethyl group), acyl groups of not more than 7 carbon atoms (such as, for example, an acetyl group, a propionyl group and a benzoyl group), alkoxycarbonyl groups of not more than 8 carbon atoms, carbamoyl groups of not more than 6 carbon atoms (such as, for example, a carbamoyl group, an N,N-dimethylcarbamoyl group and a morpholinocarbamoyl group), sulfamoyl groups (such as, for example, a sulfamoyl group, an N,N-dimethylsulfamoyl group, a morphonylsulfonyl group and a piperidinosulfonyl group), a cyano group, a trifluoromethyl group and a hydroxy group. The combination in which $V_1$ and $V_2$ are each a chlorine atom and either or both of $V_3$ and $V_4$ are each a trifluoromethyl group, a chlorine atom, or a cyano group is especially preferred.

In the sensitizing dyes of formula (II), the substituents indicated hereinbelow are preferred among the possible substituents. Specifically, in the case of $R_4$, $R_5$ and $R_6$, which may be identical with or different from one another, preferred substituents include —$(CH_2)_j(CF_2)_kF$ groups (wherein j, which may be equal or not equal to k, is 0 or an integer having a value of 1 to 8, providing that the total value of j and k is greater than 0), unsaturated alkyl groups having not more than 6 carbon atoms (such as, for example, a methyl group, an ethyl group, a propyl group, a butyl group, a pentyl group, a vinylmethyl group and a cyclohexyl group), and substituted alkyl groups [such as, for example, alkyl groups of not more than 6 carbon atoms which have, as substituents therefor, a carboxy group, a sulfo group, a cyano group, halogen atoms (such as, for example, a fluorine atom, a chlorine atom and a bromine atom), a hydroxy group, alkoxycarbonyl groups having not more than 8 carbon atoms (such as, for example, a methoxycarbonyl group, an ethoxycarbonyl group, a phenoxycarbonyl group and a benzyloxycarbonyl group), alkoxy groups of not more than 8 carbon atoms (such as, for example, a methoxy group, an ethoxy group, a benzyloxy group and a phenethyloxy group), monocyclic aryloxy groups of not more than 10 carbon atoms (such as, for example, a phenoxy group and a p-tolyloxy group), acyloxy groups of not more than 3 carbon atoms (such as, for example, an acetyloxy group and a propionyloxy group), acyl groups of not more than 8 carbon atoms (such as, for example, an acetyl group, a propionyl group, a benzoyl group and a mesyl group), carbamoyl groups (such as, for example, a carbamoyl group, an N,N-dimethylcarbamoyl group, a morpholinocarbonyl group and a piperidinocarbonyl group), sulfamoyl groups (such as, for example, a sulfamoyl group, an N,N-dimethylsulfamoyl group, a morpholinosulfonyl group and a piperidinosulfonyl group), and aryl groups of not more than 10 carbon atoms (such as, for example, a phenyl group, a 4-chlorophenyl group, a 4-methylphenyl group and an α-naphthyl group)], providing that at least one of $R_4$, $R_5$ and $R_6$ represents an alkyl group of not more than 6 carbon atoms substituted with a sulfo group or a carboxy group.

In the case of $V_5$, $V_6$, $V_7$ and $V_8$, which may be identical with or different from one another, preferred substituents include a hydrogen atom, halogen atoms (such as, for example, a fluorine atom, a chlorine atom and a bromine atom), alkyl groups of not more than 6 carbon atoms (such as, for example, a methyl group, an ethyl group, a vinylmethyl group and a cyclohexyl group), acyl groups of not more than 8 carbon atoms (such as, for example, an acetyl group, a propionyl group, a benzoyl group and a mesyl group), acyloxy groups of not more than 3 carbon atoms (such as, for example, an acetoxy group), alkoxycarbonyl groups of not more than 8 carbon atoms (such as, for example, a methoxycarbonyl group, an ethoxycarbonyl group and a benzyloxycarbonyl group), carbamoyl groups of not more than 8 carbon atoms (such as, for example, a carbamoyl group, an N,N-dimethylcarbamoyl group, a morpholinocarbonyl group and a piperidinocarbonyl group), sulfamoyl groups of not more than 8 carbon atoms (such as, for example, a sulfamoyl group, an N,N-dimethylsulfamoyl group, a morpholinosulfonyl group and a piperidinosulfonyl group), a cyano group, a trifluoromethyl group and a hydroxy group.

In the sensitizing dyes of formula (II), $l_2$ and $m_2$ are particularly preferable, in the case that the total value of $l_2$ and $m_2$ is not greater than 8 and greater than 0, the substituents indicated hereinbelow are particularly preferred among the possible substituents. Specifically, in the case of $R_4$, $R_5$ and $R_6$, which may be identical with or different from one another, particularly preferred substituents include —$(CH_2)_j(CF_2)_kF$ groups (wherein j, which may be equal or not equal to k, represents 0 or an integer of the value of 1 to 8, providing that the total value of j and k is an integer greater than 0 and preferably the total value of j and k is not greater than 8 and greater than 0), unsaturated alkyl groups of not more than 6 carbon atoms (such as, for example, a methyl group, an ethyl group, a propyl group, a butyl group, a pentyl group, a vinylmethyl group and a cyclohexyl group), and substituted alkyl groups of not more than 12 carbon atoms [such as, for example, alkyl groups of not more than 6 carbon atoms which have, as substituents therefor, a carboxy group, a sulfo group, a cyano group, halogen atoms, a hydroxy group, alkoxycarbonyl groups of not more than 6 carbon atoms, alkoxy groups of not more than 6 carbon atoms, monocyclic aryloxy groups of not more than 10 carbon atoms, acyloxy groups of not more than 3 carbon atoms, acyl groups of not more than 8 carbon atoms, sulfamoyl groups, and aryl groups of not more than 10 carbon atoms], providing that at least one of $R_4$, $R_5$ and $R_6$ represents an alkyl group of not more than 6 carbon atoms containing a sulfo group or a carboxy group. In the case of $V_5$, $V_6$, $V_7$ and $V_8$, which may be identical with or different from one another, particularly preferred substituents include a hydrogen atom, halogen atoms (such as, for example, a chlorine atom), alkyl groups of not more than 4 carbon atoms (such as, for example, a methyl group, an ethyl group and a vinyl methyl group), acyl groups of not more than 7 carbon atoms (such as, for example, an acetyl group, a propionyl group and a benzoyl group), alkoxycarbonyl groups of not more than 8 carbon atoms, carbamoyl groups of not more than 6 carbon atoms (such as, for example, a carbamoyl group, an N,N-dimethylcarbamoyl group and a morpholinocarbamoyl group), sulfamoyl groups of not more than 6 carbon atoms (such as, for example, a sulfamoyl group, an N,N-dimethylsulfamoyl group, a morphonylsulfonyl group and a piperidinosulfonyl group), a cyano group, a trifluoromethyl group and a hydroxy group. The combination in which $V_5$ and $V_7$ are each a chlorine atom and either or both of $V_6$ and $V_8$ are each a trifluoromethyl group, a chlorine atom, or a cyano group is especially preferred.

In the sensitizing dyes of formula (III), those substituents of $Y_1$, $Z_1$, $Z_2$ and $R_7$ through $R_{10}$ indicated hereinbelow are preferred among the possible substituents.

In the case of $Y_1$, preferred substituents include an oxygen atom, a sulfur atom, a selenium atom, and N—$R_{10}$. Here, an oxygen atom is preferred to the other substituents.

In the case of $Z_1$ and $Z_2$, which may be identical with or different from each other, preferred substituents include atomic groups necessary for the formation of an unsubstituted or substituted benzene ring or naphthalene ring.

Desirable substituents for the benzene ring or naphthalene ring include halogen atoms (such as, for example, a fluorine atom, a chlorine atom and a bromine atom), alkyl groups of not more than 6 carbon atoms (such as, for example, a methyl group, an ethyl group, a propyl group, a vinylmethyl group, a 2-methylpropyl group, a butyl group and a hexyl group), alkoxy groups of not more than 8 carbon atoms (such as, for example, a methoxy group, an ethoxy group, a butyloxy group, a benzyloxy group and a phenethyloxy group), aryl groups of not more than 8 carbon atoms (such as, for example, a phenyl group, a 4-methylphenyl group and a 4-chlorophenyl group), aryloxy groups of not more than 8 carbon atoms (such as, for example, a phenoxy group, a 4-methylphenoxy group and a 4-chlorophenoxy group), acyl groups of not more than 8 carbon atoms (such as, for example, an acetyl group, a propionyl group, a benzoyl group and a mesyl group), alkoxycarbonyl groups of not more than 8 carbon atoms (such as, for example, a methoxycarbonyl group, an ethoxycarbonyl group, a butyloxycarbonyl group and a benzyloxycarbonyl group), acyloxy groups of not more than 3 carbon atoms (such as, for example, an acetyloxy group and a propionyloxy group), a cyano group, a trifluoromethyl group, a carboxyl group and a hydroxy group. In the case of $Z_1$ and $Z_2$, particularly desirable substituents are benzene derivatives having a phenyl group, a chlorine atom, and a methoxy group as substituents bound to the 5-position of the benzene ring.

In the case of $R_7$, $R_8$ and $R_{10}$, desirable substituents include alkyl groups of not more than 8 carbon atoms (such as, for example, a methyl group, an ethyl group, a propyl group, a vinylmethyl group, a butyl group, a pentyl group, a hexyl group, a heptyl group and an octyl group) and alkyl groups of not more than 6 carbon atoms which have, as substituents therefor, a hydroxy group, a carboxy group, a sulfo group, a cyano group, halogen atoms (such as, for example, a fluorine atom, a chlorine atom and a bromine atom), alkoxycarbonyl groups of not more than 8 carbon atoms (such as, for example, a methoxycarbonyl group, an ethoxycarbonyl group and a benzyloxycarbonyl group), alkoxy groups of not more than 8 carbon atoms (such as, for example, a methoxy group, an ethoxy group, a butyloxy group, a benzyloxy group and a phenethyloxy group), aryloxy groups of not more than 8 carbon atoms (such as, for example, a phenoxy group and a p-tolyloxy group), acyloxy groups of not more than 3 carbon atoms (such as, for example, an acetyloxy group and a propionyloxy group), acyl groups of not more than 8 carbon atoms (such as, for example, an acetyl group, a propionyl group, a benzoyl group and a 4-fluorobenzoyl group), carbamoyl groups of not more than 6 carbon atoms (such as, for example, a carbamoyl group, an N,N-dimethylcarbamoyl group, a morpholinocarbonyl group and a piperidinocarbonyl group), sulfamoyl groups of not more than 6 carbon atoms (such as, for example, a sulfamoyl group, an N,N-dimethylsulfamoyl group, a morpholinosulfonyl group and a piperidinosulfonyl group), and aryl groups of not more than 10 carbon atoms (such as, for example, a phenyl group, a p-fluorophenyl group, a p-hydroxyphenyl group, a p-carboxyphenyl group and a p-sulfophenyl group). It is imperative here that at least one of $R_7$, $R_8$ and $R_{10}$ should possess an acid substituent.

In the case of $R_9$, preferred substituents include a hydrogen atom, alkyl groups of not more than 4 carbon atoms (such as, for example, a methyl group, an ethyl group, a propyl group and a butyl group) and aralkyl groups of not more than 10 carbon atoms (such as, for example, a benzyl group, a phenethyl group and a 3-phenylpropyl group).

In the sentitizing dyes of the general formula (IV) usable for the present invention, those substituents of $Y_2$, $Z_3$, $Z_4$ and $R_{11}$ through $R_{14}$ indicated hereinbelow are preferred among the possible substituents. In the case of $Y_2$, preferred substituents include a sulfur atom, a selenium atom and N—$R_{14}$. In the case of $Z_3$ and $Z_4$, which may be identical with or different from each other, preferred substituents include atomic groups necessary for the formation of an unsubstituted or substituted benzene ring or naphthalene ring.

Preferred substituents for the benzene ring or naphthalene ring include halogen atoms (such as, for example, a fluorine atom, a chlorine atom and a bromine atom), alkyl groups of not more than 6 carbon atoms (such as, for example, a methyl group, an ethyl group, a propyl group, a vinylmethyl group, a 2-methylpropyl group, a butyl group and a hexyl group), alkoxy groups of not more than 8 carbon atoms (such as, for example, a methoxy group, an ethoxy group, a butyloxy group, a benzyloxy group and a phenethyloxy group), aryl groups of not more than 8 carbon atoms (such as, for example, a phenyl group, a 4-methylphenyl group and a 4-chlorophenyl group), aryloxy groups of not more than 8 carbon atoms (such as, for example, a phenoxy group, a 4-methylphenoxy group and a 4-chlorophenoxy group), acyl groups of not more than 8 carbon atoms (such as, for example, an acetyl group, a propionyl group, a benzoyl group and a mesyl group), alkoxycarbonyl groups of not more than 8 carbon atoms (such as, for example, a methoxycarbonyl group, an ethoxycarbonyl group, a butyloxycarbonyl group and a benzyloxycarbonyl group), acyloxy groups of not more than 3 carbon atoms (such as, for example, an acetyloxy group and a propionyloxy group), a cyano group, a trifluoromethyl group, a carboxyl group and a hydroxy group.

In the case of $R_{11}$, $R_{12}$, $R_{13}$ and $R_{14}$, preferred substituents include alkyl groups of not more than 8 carbon atoms (such as, for example, a methyl group, an ethyl group, a propyl group, a vinylmethyl group, a butyl group, a pentyl group, a hexyl group, a heptyl group and an octyl group) and substituted alkyl groups of not more than 6 carbon atoms which have, as substituents therefor, a hydroxy group, a carboxyl group, a sulfo group, a cyano group, halogen atoms (such as, for example, a fluorine atom, a chlorine atom and a bromine atom), alkoxycarbonyl groups of not more than 8 carbon atoms (such as, for example, a methoxycarbonyl group, an ethoxycarbonyl group and a benzyloxycarbonyl group), alkoxy groups of not more than 8 carbon atoms (such as, for example, a methoxy group, an ethoxy group, a butyloxy group, a benzyloxy group and a phenethyloxy group), aryloxy groups of not more than 8 carbon atoms (such as, for example, a phenoxy group, a 4-methylphenoxy group and a 4-chlorophenoxy group), acyloxy groups of not more than 3 carbon atoms (such as, for example, an acetyloxy group and a propionyloxy group), acyl groups of not more than 8 carbon atoms (such as, for example, an acetyl group, a propionyl group, a benzoyl group and a 4-fluorobenzoyl group), carbamoyl groups of not more than 6 carbon atoms (such as, for example, a carbamoyl group, an N,N-dimethylcarbamoyl group, a morpholinocarbonyl group and a piperidinocarbonyl group), sulfamoyl groups of not more than 6 carbon atoms (such as, for example, a sulfamoyl group, an N,N-dimethylsulfamoyl group, a morpholinosulfonyl group and a piperidinosulfonyl group), and aryl groups of not more than 10 carbon atoms (such as, for example, a phenyl group, a p-fluorophenyl group, a p-hydroxyphenyl group, a p-carboxyphenyl group and a p-sulfophenyl group). It is essential here that at least one of $R_{11}$, $R_{12}$, $R_{13}$ and $R_{14}$ should possess an acid substituent.

Specific examples of the dyes represented by formula (I), formula (II), formula (III) and formula (IV) of this invention will be cited hereinbelow. It should be noted that the dyes usable for the present invention are not limited to these specific examples.

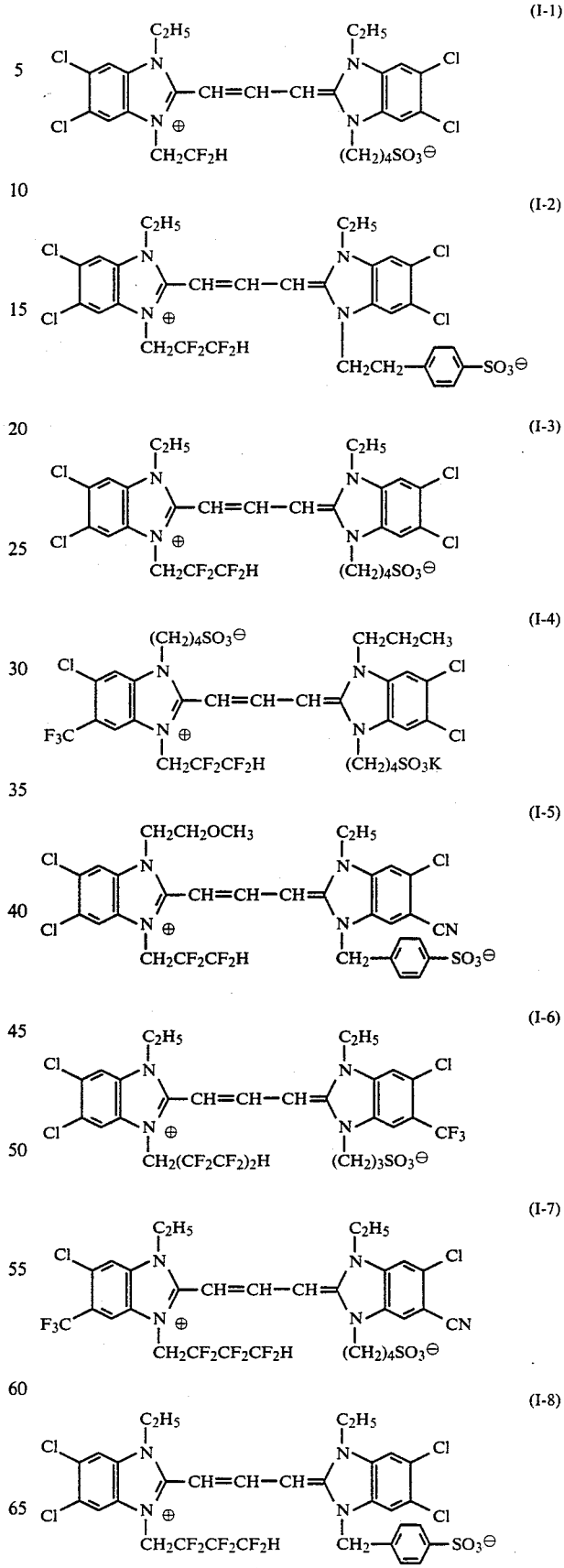

-continued
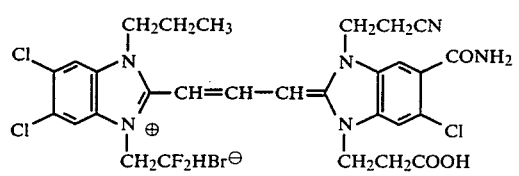 (I-9)
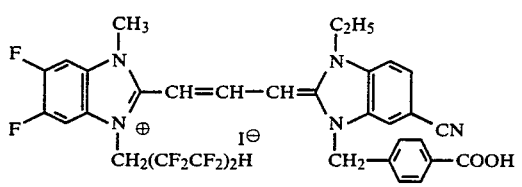 (I-10)
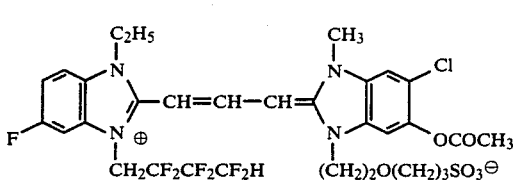 (I-11)
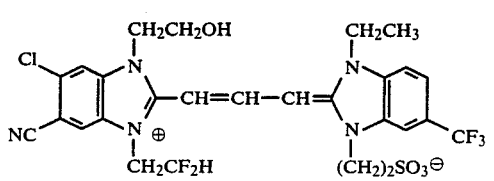 (I-12)
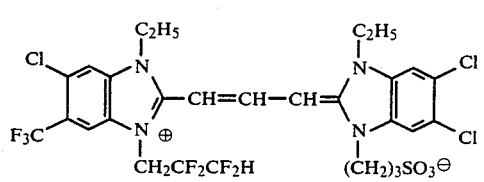 (I-13)
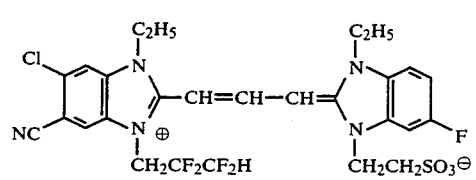 (I-14)
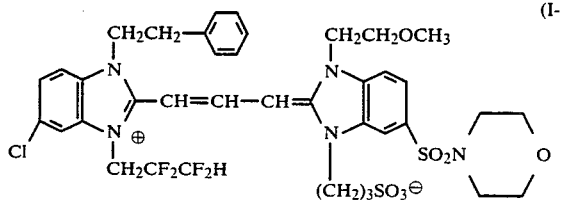 (I-15)
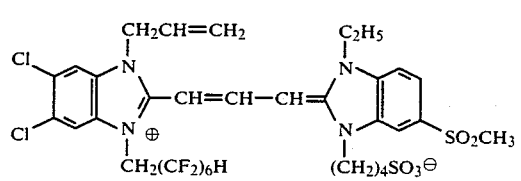 (I-16)
-continued
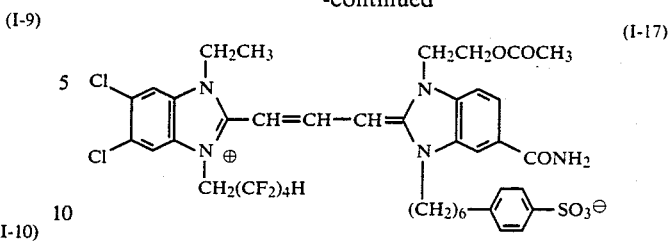 (I-17)
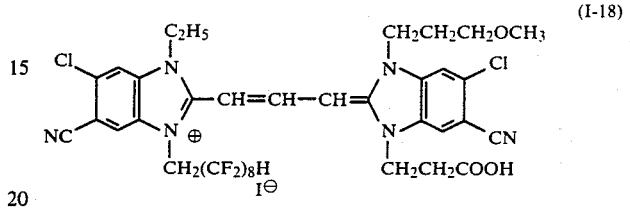 (I-18)
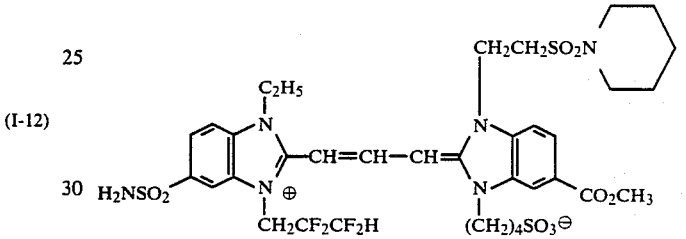 (I-19)
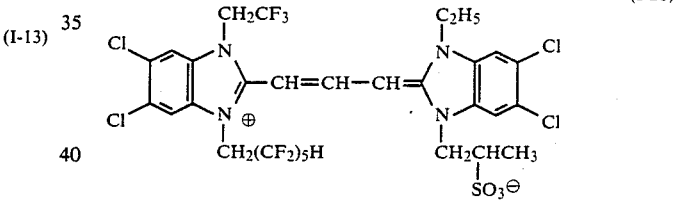 (I-20)
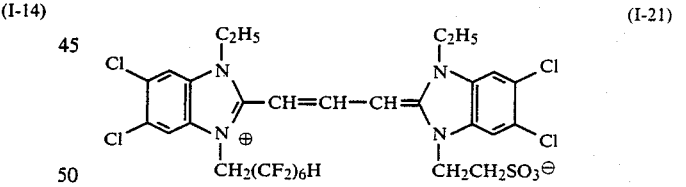 (I-21)
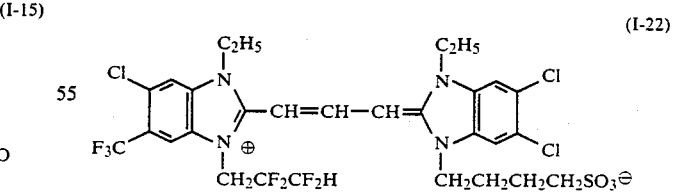 (I-22)
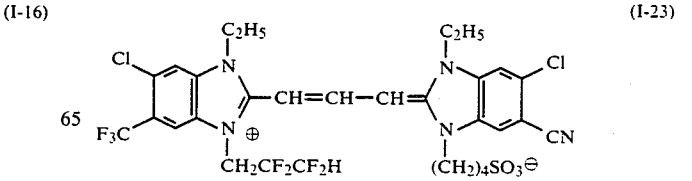 (I-23)

-continued
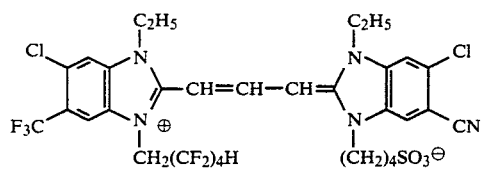 (I-24)
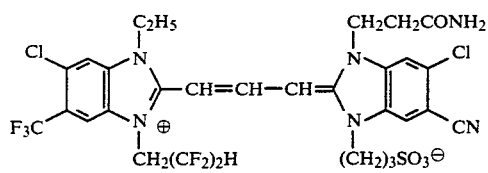 (I-25)
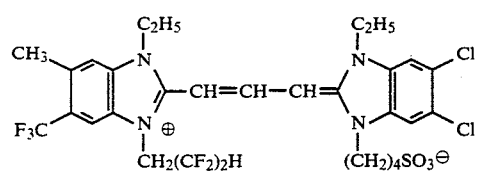 (I-26)
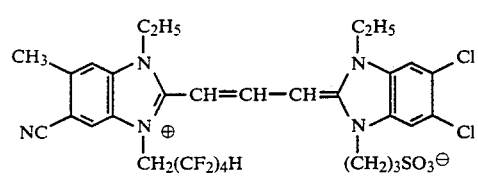 (I-27)
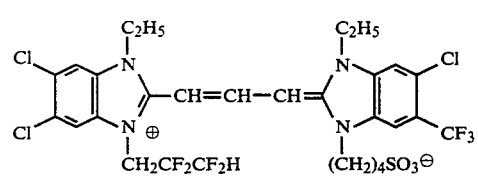 (I-28)
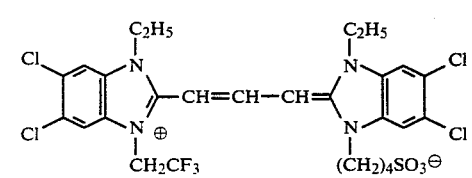 (II-1)
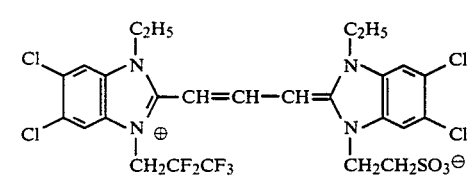 (II-2)
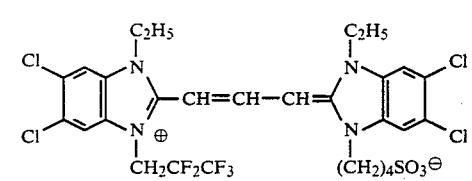 (II-3)
-continued
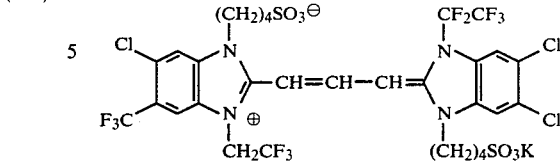 (II-4)
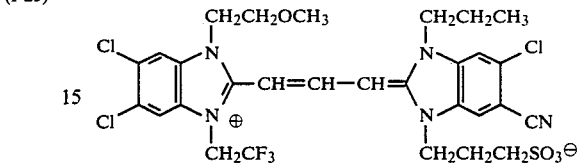 (II-5)
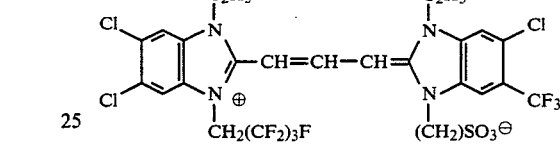 (II-6)
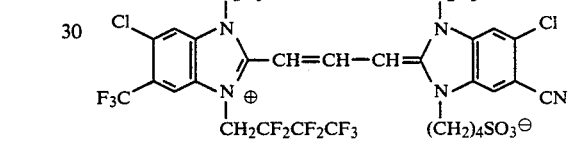 (II-7)
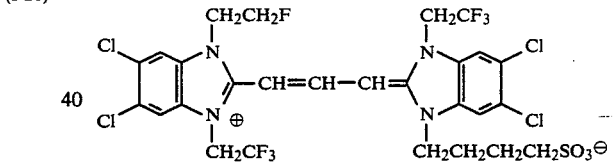 (II-8)
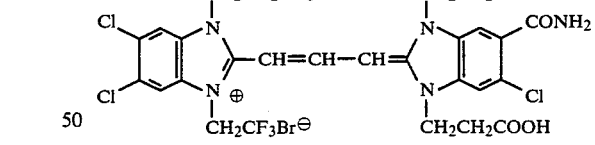 (II-9)
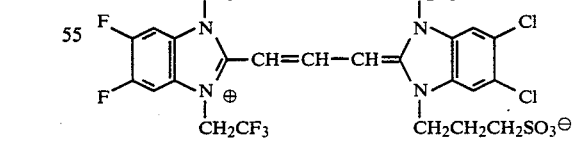 (II-10)
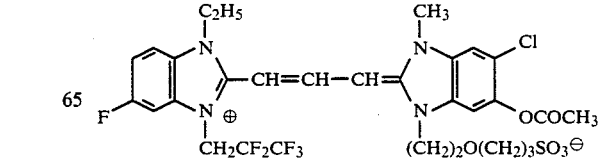 (II-11)

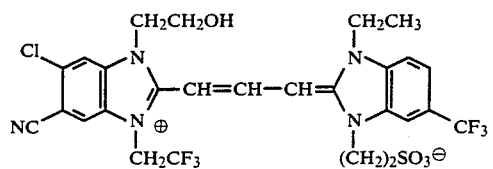 (II-12)
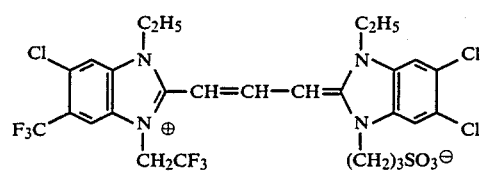 (II-13)
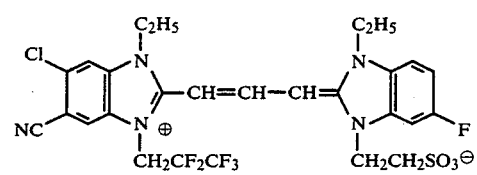 (II-14)
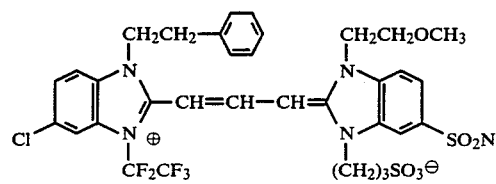 (II-15)
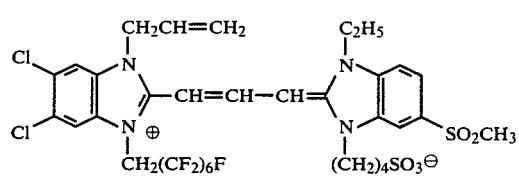 (II-16)
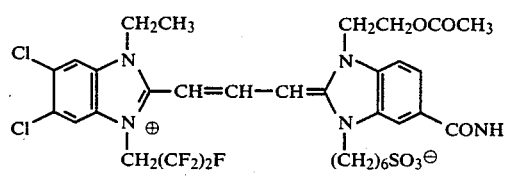 (II-17)
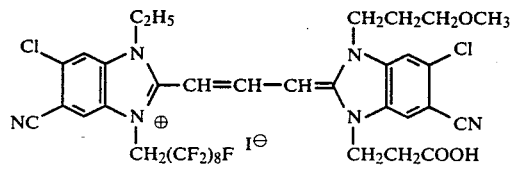 (II-18)
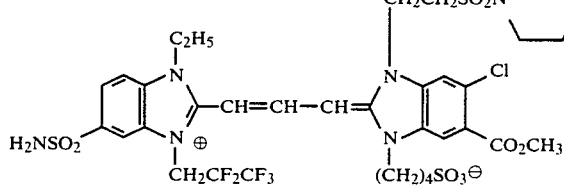 (II-19)
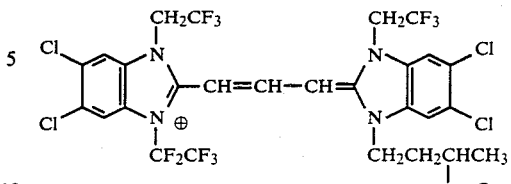 (II-20)
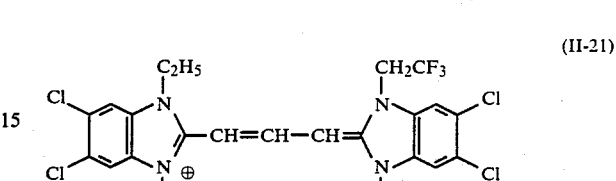 (II-21)
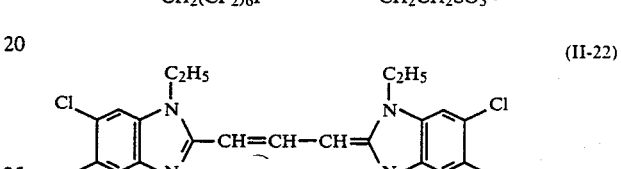 (II-22)
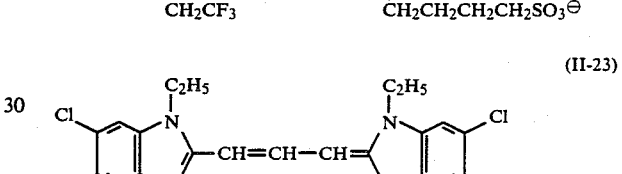 (II-23)
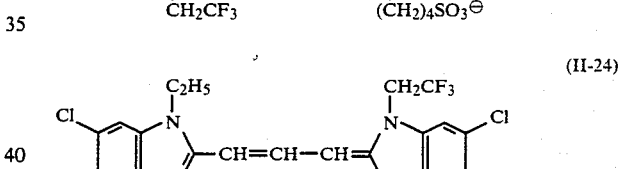 (II-24)
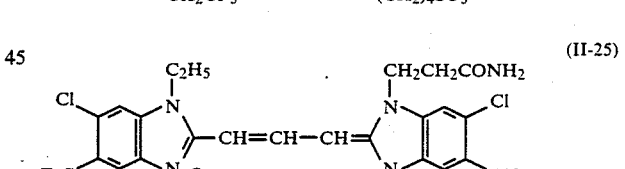 (II-25)
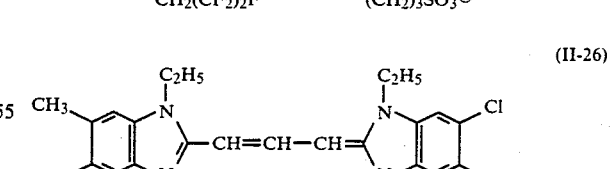 (II-26)
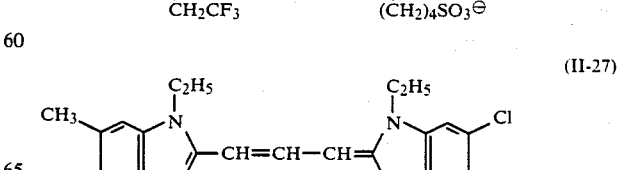 (II-27)

-continued
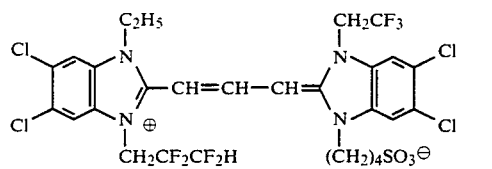
(II-28)
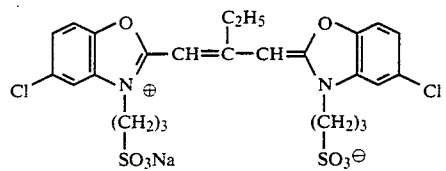
(III-1)
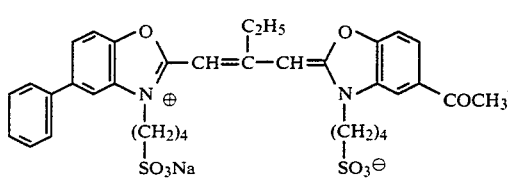
(III-2)
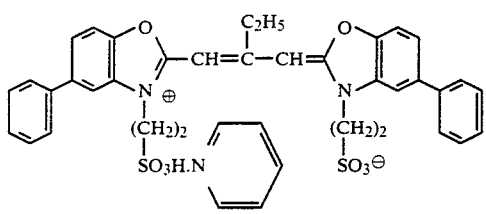
(III-3)
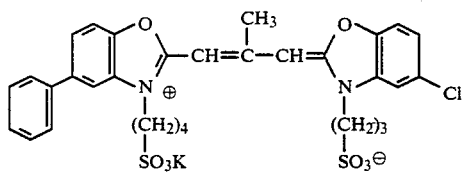
(III-4)
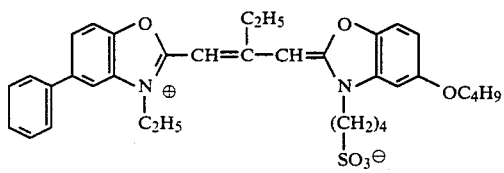
(III-5)
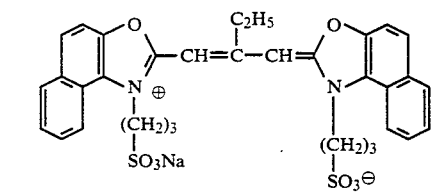
(III-6)
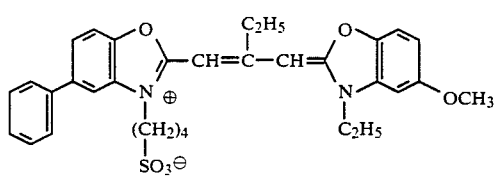
(III-7)
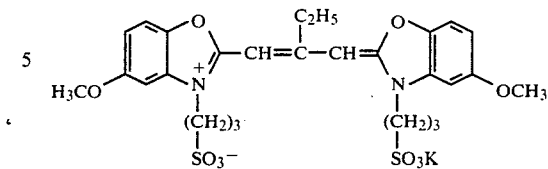
(III-8)
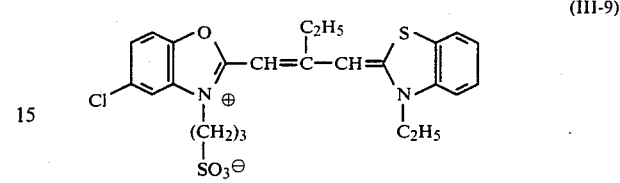
(III-9)
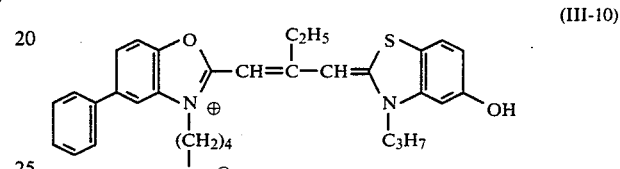
(III-10)
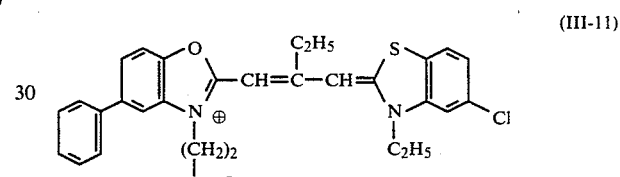
(III-11)
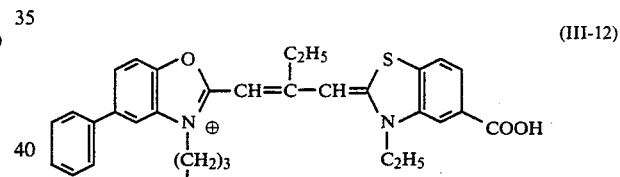
(III-12)
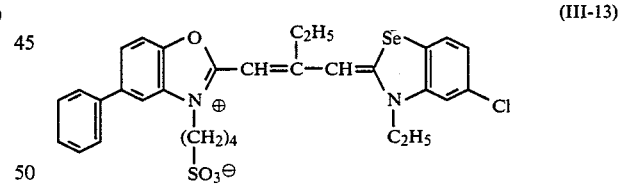
(III-13)
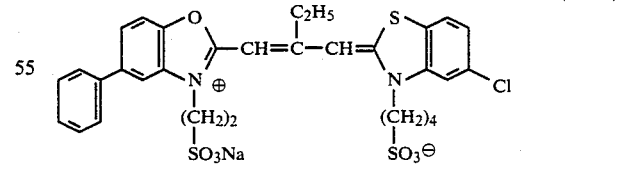
(III-14)
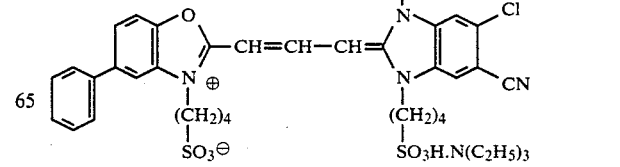
(III-16)

-continued (III-17), (III-18), (III-19), (III-20), (III-21), (III-22), (IV-1), (IV-2), (IV-3), (IV-4), (IV-5), (IV-6), (IV-7), (IV-8), (IV-9)

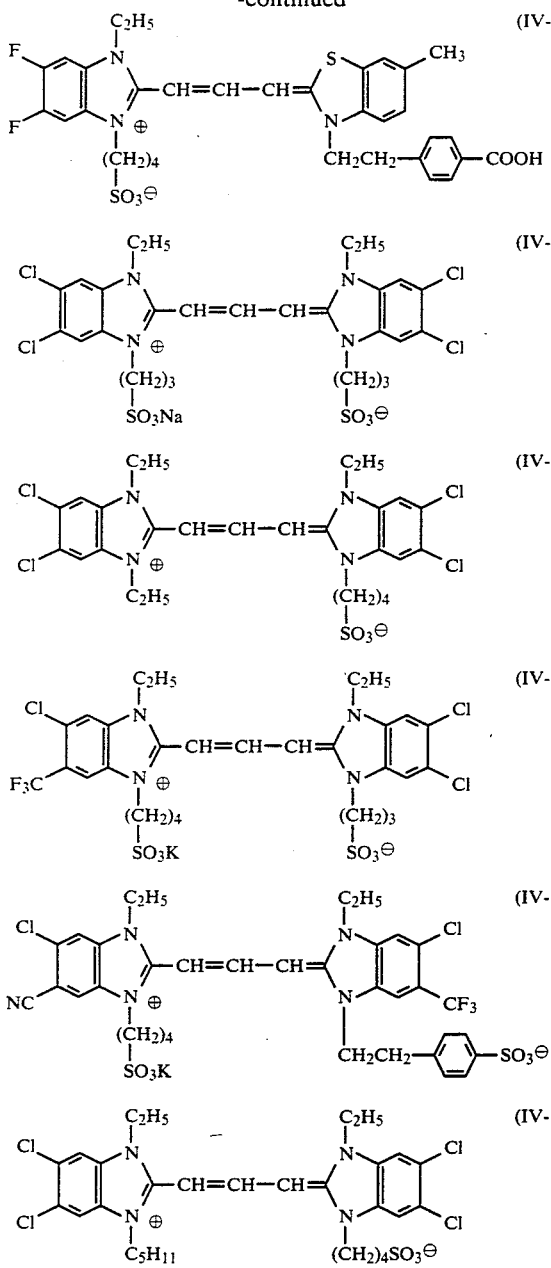

The compounds of formulae (I) and (II) of the present invention can be easily produced by synthesizing fluorinated alkyl esters, fluorinated alkylamines, and fluorinated alkyl iodides of sulfonic acids according to the manner as described in J. Org. Chem., 26, 4021 (1961), J. Amer. Chem. Soc., 77, 3149 (1955), J. Amer. Chem. Soc., 78, 4999 (1956), etc., and then treating these synthesis products in accordance with the methods disclosed in U.S. Pat. Nos. 2,739,149 and 2,912,329 and British Pat. Nos. 654,690 and 815,172.

At least one of the compounds of formulae (I) and (II) and at least one of the compounds of formulae (III) and (IV) are contained in the silver halide photographic emulsion in a combined amount of from $1 \times 10^{-6}$ mol to $5 \times 10^{-3}$ mol, preferably from $1 \times 10^{-5}$ mol to $3 \times 10^{-3}$ mol, and particularly preferably from $5 \times 10^{-5}$ mol to $2 \times 10^{-3}$ mol, per mol of silver halide. The molar ratio of dye of formulae (III) and (IV) to dye of formulae (I) and (II) as used in the emulsion is generally in the range of from 1:20 to 10:1, and preferably in the range of from 1:10 to 5:1.

The dyes which are used in the present invention can be directly dispersed in the emulsion. Optionally, these dyes may be dissolved in a suitable solvent such as, for example, methyl alcohol, ethyl alcohol, ethyl alcohol, propyl alcohol, methyl cellosolve, any of the halogenated alcohols disclosed in Japanese Patent Application (OPI) No. 9715/73 and U.S. Pat. No. 3,756,830, acetone, water, or pyridine, or a suitable mixture thereof, and added in the form of solutions to the emulsion.

The aforementioned sensitizing dyes may be uniformly dispersed in the silver halide emulsion before the emulsion is applied to a suitable support. Of course, this dispersion may be effected at any step in the whole course of the preparation of the silver halide emulsion.

The silver halide to be used in the photographic emulsion of the present invention may be any member selected from the group consisting of silver bromide, silver iodobromide, silver iodochlorobromide, silver chlorobromide and silver chloride. Preferred silver halides are silver bromide, silver chlorobromide, silver iodobromide and silver iodochlorobromide. Particularly preferred silver halides are silver iodobromide and silver bromide.

The silver halide particles in the photographic emulsion may be in the shape of such regular crystals as cubes and octahedrons or such irregular crystals as spheres and tablets or in the combination shape of varying crystals. Otherwise, the photographic emulsion may comprise the silver halide particles having various shapes of crystals.

The individual silver halide particles may possess different phases in the internal core and in the surface layer or they may be formed of one uniform phase throughout the volume. They may be of a type such that they form a latent image chiefly in the surface portion (such as those in negative emulsion) or a type such that they form a latent image chiefly in the inner portion (such as those of inner latent image type emulsion or preliminary fogged direct reversal type emulsion). Preferably, they may be of a type containing a fogging agent and used for inner latent image type direct reversal emulsion.

The silver halide particles may be produced by a method which effects formation of the particles in the presence of excess silver ions (popularly called "reversal mixing method"). As one form of the double jet mixing method, the so-called controlled double jet method which maintains the pAg of the liquid phase for the formation of the silver halide, at a fixed level, may be adopted.

By this method, there is obtained a silver halide emulsion in which the particles are regular crystals of a substantially uniform particle size.

Two or more separately formed dissimilar types of silver halide emulsions may be mixed and used.

During the formation of silver halide particles, a silver halide solvent such as, for example, ammonia, potassium rhodanite, ammonium rhodanite, or thioether compound may be used for controlling the growth of silver halide particles.

The formation or physical aging of silver halide particles may be allowed to proceed in the presence of a cadmium salt, zinc salt, thallium salt, iridium salt or complex salt thereof, rhodium salt or complex salt thereof, or iron salt or complex salt thereof.

Examples of the inner latent image type emulsion usable for the present invention include conversion type emulsions, core/shell type emulsions, and emulsions incorporating dissimilar metals, such as are disclosed in U.S. Pat. Nos. 2,592,250, 3,206,313, 3,447,927, 3,761,276 and 3,935,014.

Silver halide emulsions are generally subjected to chemical sensitization. More specifically, the sulfur sensitizing method, which uses an activated gelatin or a sulfur-containing compound capable of reacting with silver (such as, for example, thiosulfates, thioureas, mercapto compounds, and rhodanines), the reduction sensitizing method which uses a reducing substance (such as, for example, stannous salts, amines, hydrazines, formamidine sulfonic acids, and silane compounds), and the noble metal sensitizing method which uses a noble metal compound (such as, for example, complex salts of gold and complex salts of metals of Group VIII of the Periodic Table of Elements such as Pt, Ir and Pd) may be used either independently or in suitable combination.

Concrete examples of the chemical sensitizer usable herein include sulfur sensitizers such as allylthiocarbamide, thiourea, sodium thiosulfate, and cystine, noble metal sensitizers such as potassium chloroaurate, aurous thiosulfate, and potassium chloropalladate, and reducing sensitizers such as tin chloride, phenyl hydrazine, and reductones. Other sensitizers such as polyoxyethylene compounds, polyoxypropylene compounds, and compounds having a quaternary ammonium group may be also included.

The photographic emulsion to be used for this invention may contain various compound for the purpose of preventing the occurrence of fog during the preparation or storage prior to use of light-sensitive materials or of stabilizing the photographic properties of such light-sensitive materials. Numerous compounds are known to be useful for this purpose. Examples of these compounds known as antifogging agents or stabilizers include azoles such as benzothiazolium salts, nitroindazoles, triazoles, benzotriazoles, and benzimidazoles (particularly, nitro- or halogen-substituted derivatives); heterocyclic mercapto compounds such as mercaptothiazoles, mercaptobenzothiazoles, mercaptobenzimidazoles, mercaptothiadiazoles, mercaptotetrazoles (particularly, 1-phenyl-5-mercaptotetrazole), and mercaptopyrimidines; the aforementioned heterocyclic mercapto compounds modified to incorporate therein water-soluble groups such as a carboxyl group and/or sulfonyl group; thioketo compounds such as oxazolinethione; azaindenes such as tetraazaindenes (particularly, 4-hydroxy-substituted(1,3,3a,7)tetraazaindenes); benzenethiosulfonic acids; and benzene sulfinic acids.

The silver halide photographic emulsion of the present invention may contain a color coupler such as cyan coupler, magenta coupler or yellow coupler and a compound capable of dispersing the coupler.

In other words, a compound which gives rise to color by oxidation coupling with an aromatic primary amino developing agent (such as, for example, a phenylenediamine derivative or aminophenol derivative) in the processing for color development may be contained. Examples of the magenta coupler include 5-pyrazolone coupler, pyrazolobenzimidazole coupler, cyanoacetyl cumarone coupler, and open chain acylacetonitrile coupler. Examples of the yellow coupler include acylacetamide couplers (such as benzoylacetanilides and pivaloylacetanilides). Examples of the cyan coupler include naphthol coupler and phenol coupler. These couplers are preferred to be of a nondiffusion type containing a hydrophobic group called a ballast group in the molecular unit. The couplers may be 4-equivalent type or 2-equivalent type relative to the silver ions. They may be colored couplers which are effective in color correction or couplers of the type capable of releasing a development inhibiting agent (so-called DIR couplers).

Besides the DIR couplers, colorless DIR coupling compounds which, through coupling reaction, give colorless products and release development inhibiting agent may be counted among the couplers usable herein.

The incorporation of such a coupler in the silver halide photographic emulsion layer can be carried out by any of the known methods. The method disclosed in U.S. Pat. No. 2,322,027 is one example. The coupler is dispersed in hydrophilic colloid as dissolved in a solvent which is selected from the group consisting of alkyl phthalates (such as dibutyl phthalate and dioctyl phthalate), phosphates (such as diphenyl phosphate, triphenyl phosphate, tricresyl phosphate, and dioctylbutyl phosphate), citrates (such as tributyl acetylcitrate), benzoates (such as octyl benzoate), alkylamides (such as diethyl laurylamide), fatty acid esters (such as dibutoxyethyl succinate and dioctyl azelate), and trimesic esters (such as trimesic acid tributyl), and organic solvents having boiling points of about 30° C. to 150° C. and including lower alkyl acetates such as ethyl acetate and butyl acetate, ethyl propionate, secondary butyl alcohol, methyl isobutyl ketone, β-ethoxyethyl acetate, and methyl cellosolve acetate. Optionally, any of the high boiling organic solvents and any of the low boiling organic solvents may be used as mixed with each other.

The photographic emulsion of this invention may contain a polyalkylene oxide or the ether, ester, or amine derivative thereof, a thioether compound, a thiomorpholine, a quaternary ammonium salt compound, a urethane derivative, a urea derivative, an imidazole derivative, or a 3-pyrazolidone for the purpose of increasing sensitivity, sharpening contrast and accelerating development.

As a filter dye or for the prevention of irradiation, or for various other purposes, the silver halide photographic emulsion of this invention may contain a water-soluble dye (such as, for example, an oxonol dye, a hemioxonol dye, or a merocyanine dye).

For various purposes such as aiding in application of emulsion to the support, preventing electrification, improving slippage, enhancing dispersion of emulsion, preventing adhesion, and improving photographic properties (acceleration of development, addition to high contrast, and sensitization), the photographic emulsion of this invention may contain various surface active agents.

Examples of the surface active agent usable herein include natural surface active agent such as saponins (steroid type); nonionic surface active agents such as alkylene oxide derivatives (such as polyethylene glycol and polyethylene glycol alkyl ethers), glycidol derivatives, fatty acid esters of polyhydric alcohols, and alkyl esters of sugars; amphoteric surface active agents such as alkyl carboxylates, alkyl sulfonates, alkylbenzenesulfonates, and alkylsulfuric esters; and cationic surface active agents such as alkylamine salts, aliphatic and aromatic quaternary ammonium salts, pyridinium and imidazolium and other heterocyclic quaternary ammonium salts.

In working the present invention, any of the known discoloration inhibitors may be additionally used. The photographic emulsion of this invention permits incorporation therein of one or more color image stabilizers. Examples of the discoloration inhibitors known to the art include hydroquinone derivatives, gallic acid derivatives, p-alkoxyphenols, p-oxyphenols and bisphenols.

In the photographic light-sensitizing material to be produced by this invention, the photographic emulsion layer or some other hydrophilic colloid layers may contain a synthetic polymer dispersion insoluble or sparingly soluble in water for the purpose of improving the dimensional stability. Examples are polymers which have, as their monomer components, alkyl(meth)acrylates, alkoxyalkyl(meth)acrylates, glycidyl(meth)acrylates, (meth)acrylamides, vinyl esters (such as vinyl acetate), acrylonitrile, olefins, styrene which are used independently or in suitable combinations, combinations of the monomers mentioned above with acrylic acid, methacrylic acid, $\alpha,\beta$-unsaturated dicarboxylic acids, hydroxyalkyl(meth)acrylates, sulfoalkyl(meth)acrylates, and styrenesulfonic acids.

The photographic emulsion of this invention may contain an inorganic or organic film hardening agent. Examples of the film hardening agent include chromium salts (such as chrome alum and chromium acetate), aldehydes (such as formaldehyde, glyoxal and glutaraldehyde), activated vinyl compounds (such as 1,3,5-triacryloyl-hexahydro-s-triazine and 1,3-vinylsulfonyl-2-propanol), activated halogen compounds (such as 2,4-dichloro-6-hydroxy-s-triazine). These agents may be used either independently or in suitable combinations.

The light-sensitive material produced by this invention may contain, as a color fog inhibitor, a hydroquinone derivative, an aminophenol derivative, a gallic acid derivative, or an ascorbic acid derivative.

The light-sensitive material to be produced in accordance with this invention may contain an ultraviolet ray absorbing agent in the hydrophilic colloid layer thereof. Examples of the agent include benzotriazole compounds substituted with an aryl group, 4-thiazolidone compounds, benzophenone compounds, cinnamic ester compounds, butadiene compounds, benzoxazole compounds, and ultraviolet ray absorbing polymers. Optionally, such an ultraviolet ray absorbing agent may be fixed in the aforementioned hydrophilic colloid layer.

In the light-sensitive material to be produced in accordance with this invention, when the hydrophilic colloid layer contains any dye or ultraviolet ray absorbing agent, such additive may be mordanted with a cationic polymer.

Various additives as mentioned above are described, e.g., in *Research Disclosure,* Vol. 176 (1978, XII), RD-17643.

Besides gelatin intended as a protective colloid, the silver halide photographic emulsion of the present invention may also incorporate other additives therein. Examples of the additives include acylated gelatins such as phthalated gelatin and malonated gelatin and cellulose compounds such as hydroxyethyl cellulose and carboxymethyl cellulose; soluble starches such as dextrin; hydrophilic polymers such as polyvinyl alcohol, polyvinyl pyrrolidone, polyacrylamide, and polystyrene sulfonic acid, plasticizers for dimensional stabilization, latex polymers, and matting agents. The finished emulsion is coated on a suitable support such as, for example, baryta paper, resin-coated paper, synthetic paper, triacetate film, polyethylene terephthalate film, other plastic base, or glass sheet.

The exposure of the photographic emulsion to light for the purpose of obtaining a photographic image thereon may be carried out by any ordinary method. Any of the various types of light sources known to the art may be used. Examples are natural light (sunlight), tungsten lamp, fluorescent lamp, mercury vapor lamp, xenon arc lamp, carbon arc lamp, xenon flash lamp, and cathode ray tube flying spot. The exposure time may be generally in the range of 1/1,000 second to one second, i.e., the range proper to ordinary cameras. A much shorter exposure time than 1/1,000 second such as, for example, $1/10^4$ to $1/10^6$ second proper to the xenon flash lamp or the cathode ray tube may be used. Of course, the exposure time may exceed 1 second. When desired, the light used for the exposure may have its spectral composition properly adjusted by use of a color filter. A laser beam may be utilized for the purpose of the exposure. The exposure may be effected by using the light which is released from a fluorescent substance excited with electron beam, X-ray, $\gamma$-ray, or $\alpha$-ray.

The spectral sensitizing dyes of the present invention are utilized for sensitizing silver halide photographic emulsion intended for use in various color and monochromic light-sensitive materials. Examples of the emulsion for which the dyes are usable include color positive emulsions, color paper emulsions, color negative emulsions, color reversal emulsions (possibly containing couplers or not containing couplers), plate-making photographic light-sensitive (such as lith film) emulsions, emulsions used in cathode ray tube display light-sensitive materials, emulsions used for X-ray recording light-sensitive materials (particularly direct and indirect photographic materials used on screens) and various emulsions used for printout sensitive materials and thermal developing sensitive materials in the colloid transfer process, the silver salt dispersion transfer process, the dye transfer process, and the silver dye bleaching process.

To the photographic processing of the light-sensitive material produced in accordance with the present invention, any of the known methods and any of the known processing solutions such as are dealt with in *Research Disclosure,* Vol. 176, pp. 28–30 (RD-17643) can be applied. Depending on its purpose, this photographic processing may be either the photographic processing for forming silver images (monochromic photographic processing) or the photographic processing for forming color images (color photographic processing). The temperature of this processing is generally selected in the range of 18° C. to 50° C. If desired, the processing may be performed at a temperature lower than 18° C. or a temperature higher than 50° C.

Then, the photographic emulsion of this invention may be utilized in the color dispersion transfer process which is described below. The emulsion to be used in this process may be a negative emulsion intended for forming surface latent image or a direct reversal type emulsion. An inner latent image type emulsion or a preliminarily fogged direct reversal type emulsion belongs to the latter type. An inner latent image type silver halide emulsion is used advantageously among other types of emulsions. Examples of the inner latent image type silver halide emulsion include conversion type emulsions, core/shell type emulsions, and emulsions incorporating dissimilar metals, such as are disclosed as in U.S. Pat. Nos. 2,592,250, 3,206,313, 3,447,927, 3,761,276 and 3,935,014.

Various fogging agents usable for the emulsions described above are known to the art. Examples of such fogging agents are hydrazines disclosed in U.S. Pat. Nos. 2,588,982 and 2,563,785; hydrazides and hydrazones disclosed in U.S. Pat. No. 3,227,552; quaternary chlorides disclosed in British Pat. No. 1,283,835, Japanese Patent Publication No. 38164/74 and U.S. Pat. Nos. 3,615,615, 3,719,494 and 3,734,738; sensitizing dyes containing nucleating substituents in the molecular unit thereof disclosed in U.S. Pat. No. 3,718,470; and acylhydrazinophenylthiourea compounds disclosed in U.S. Pat. Nos. 4,030,925 and 4,031,127.

Various compounds are usable in this invention as compounds capable of giving rise to dye images. Couplers and dye-releasing redox compounds are particularly advantageous among other dye image forming compounds.

The light-sensitive material for the color diffusion transfer process may further incorporate therein generally accepted additives such as, for example, dye, coupler, latex, surface active agent, silver halide developer (such as hydroquinone or pyrazolidinone), and processing compositions (alkali agent, antioxidation agent, and silver ion concentration controlling agent).

The dye-releasing redox compound can be dispersed within the hydrophilic colloid as the binder by any of the various methods generally accepted for the purpose.

The process for obtaining a color diffusion transfer image by the use of a dye-releasing redox compound is disclosed in *Photographic Science and Engineering*, Vol. 20, No. 4, pp. 155-164, July/August, 1976.

Concerning the mordant layer, the neutralizing layer, the neutralizing speed controlling layer (timing layer), and the processing composition to be used for the light-sensitive material for use in the color diffusion transfer of the present invention, those disclosed, for example, in Japanese Patent Application (OPI) No. 64533/77, can be adopted.

The light-sensitive material for the color diffusion transfer process of the present invention is desired to be a mono-sheet type film unit which remains integral constantly (with the light-sensitizing element, the image receiving element and the processing element in fast combination) throughout the period preceding the exposure, during the period of the exposure, and the period ensuing the exposure and which permits development to be made in a bright place. The film unit of this sort is disclosed in *Photographic Science and Engineering*, above, and *Neblette's Handbook of Photography and Reprography, Materials, Process and Systems*, Seventh Ed. (1977), Chapter 12, etc.

The present invention will be described specifically below with reference to working examples. It should be noted that this invention is not limited only to these working examples.

EXAMPLE 1

A silver iodobromide (iodine content: 7.5 mol%) emulsion was obtained by causing precipitation of silver halide particles by the double jet method and allowing the precipitated particles to undergo physical aging, desalting processing, and chemical aging. The silver halide particles contained in this emulsion had an average diameter of 0.75 micron. This emulsion contained 0.55 mol of silver halide per kg.

In a pot, 1 kg of the emulsion was dissolved by heating at 40° C. Methanol solutions of various sensitizing dyes in the amount indicated in Table 1 were added to and stirred with the dissolved emulsion samples. The resultant mixtures and 10 ml of an aqueous 1.0 wt% 4-hydroxy-6-methyl-1,3,3a,7-tetraazaindene solution, 10 ml of an aqueous 1.0 wt% 1-hydroxy-3,5-dichlorotriazine sodium salt solution, and 10 ml of an aqueous 1.0 wt% sodium dodecylbenzenesulfonate added thereto in the order mentioned were stirred. The finished emulsions thus obtained were coated on a cellulose triacetate film base in a thickness to provide dry films of 5 microns in thickness and then dried. Consequently, there were obtained test pieces of light-sensitive material. With a sensitometer having a light source of color temperature 5,400° K., the test films were subjected to optical wedge exposure, using a yellow SC 50 filter, which is a product of Fuji Photo Film Co., Ltd., and can transmit only light of wavelength of shorter than 500 nm, that is, in this case this filter can transmit only light of wavelength band which is spectrally sensitized by dye, and a blue filter (Wratten 47B), a product of Eastman Kodak Co., attached to the light source.

After the exposure, the test films were developed with a developer of the following composition at 20° C. for 7 minutes, processed to stop the development, processed in a fixing bath, and washed with water, to provide strips containing prescribed monochromic images. These strips were tested by a P-type densitometer, a product of Fuji Photo Film Co., Ltd., for density to find data on sensitivity and fogging. The standard point for optical density used for the determination of sensitivity was fixed at fog+0.20.

| Composition of Developer | |
|---|---|
| Water | 700 ml |
| Metol | 2 g |
| Anhydrous Sodium Sulfite | 100 g |
| Hydroquinone | 5 g |
| Borax (pentahydrate) | 1.5 g |
| Water to make | 1 liter |

The results are shown in relative values in Table 1. From the results, it is noted that the combination of materials conforming to this invention resulted in production of a light-sensitive material having high sensitivity and involving minimal fog.

TABLE 1

| Test No. | Sensitizing Dyes and Amounts of Use ($\times 10^{-5}$ mol/1 kg of emulsion) | | | Relative Sensitivity (yellow filter) | Relative Sensitivity (blue filter) | Fog |
|---|---|---|---|---|---|---|
| 1 | — | | | — | 100 | 0.05 |
| 2 | (I-3) | 4 | | 100 | 96 | 0.05 |
| 3 | | 8 | | 135 | 85 | 0.05 |
| 4 | | 16 | | 186 | 81 | 0.05 |
| 5 | | 32 | | 135 | 38 | 0.10 |
| 6 | | (III-8) | 16 | 145 | 91 | 0.05 |

TABLE 1-continued

| Test No. | Sensitizing Dyes and Amounts of Use ($\times 10^{-5}$ mol/1 kg of emulsion) | | | | | | Relative Sensitivity (yellow filter) | Relative Sensitivity (blue filter) | Fog |
|---|---|---|---|---|---|---|---|---|---|
| 7 | | | | 32 | | | 182 | 85 | 0.05 |
| 8 | | | | 64 | | | 91 | 45 | 0.09 |
| 9 | (I-3) | 2 | (III-8) | 32 | | | 251 | 91 | 0.05 |
| 10 | | 4 | | 32 | | | 270 | 89 | 0.05 |
| 11 | (I-3) | 2 | (III-8) | 32 | (III-9) | 2 | 275 | 91 | 0.05 |
| 12 | | 4 | | 32 | | 2 | 303 | 91 | 0.05 |
| 13 | | | (III-15) | 8 | | | 135 | 79 | 0.05 |
| 14 | | | | 16 | | | 186 | 79 | 0.05 |
| 15 | | | | 32 | | | 141 | 47 | 0.12 |
| 16 | (I-3) | 2 | (III-15) | 16 | | | 234 | 79 | 0.05 |
| 17 | | 4 | | 16 | | | 245 | 79 | 0.05 |
| 18 | (I-3) | 4 | (III-15) | 16 | (IV-1) | 0.5 | 288 | 79 | 0.05 |
| 19 | (I-8) | 4 | | | | | 96 | 98 | 0.05 |
| 20 | | 8 | | | | | 132 | 87 | 0.05 |
| 21 | | 16 | | | | | 177 | 87 | 0.05 |
| 22 | | 32 | | | | | 142 | 46 | 0.11 |
| 23 | | | (III-4) | 8 | | | 155 | 83 | 0.05 |
| 24 | | | | 16 | | | 191 | 76 | 0.05 |
| 25 | | | | 32 | | | 148 | 52 | 0.12 |
| 26 | (I-8) | 4 | (III-4) | 16 | | | 264 | 76 | 0.05 |
| 27 | | 8 | | 16 | | | 282 | 76 | 0.05 |

EXAMPLE 2

Into silver halide emulsion as was used in Example 1 there were incorporated various sensitizing dyes in the same manner as in Example 1, then the resultant emulsions were applied to a support and dried to produce test light-sensitive materials. One piece of each test film was left standing for three days under the conditions of 75% of relative humidity at 50° C. Another piece of the test film was left standing for three days under the conditions of 20% of relative humidity at 50° C. These pieces of test films were exposed, developed, and tested for change of sensitivity and fog in the same manner as in Example 1. The results are shown in relative values in Table 2.

Dye A for Comparison

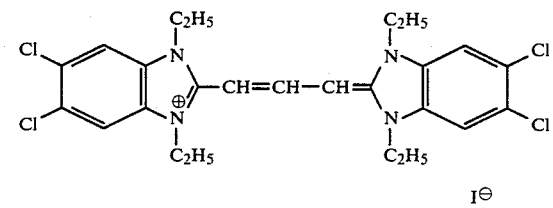

From the results given in Table 2, it is clear that the sensitizing dyes of this invention showed only sparing increase in fog under the conditions of 20% RH and 50°

TABLE 2

| Test No. | Sensitizing Dyes and Amounts of Use ($\times 10^{-5}$ mol/1 kg of emulsion) | | | | | | (a) 3 Days at 60% RH, 20° C. | | (b) 3 Days at 20% RH, 50° C. | | 3 Days at 75% RH, 50° C. | | Retension of Sensitivity under Conditions of High Temperature and High Humidity (b/a × 100) (%) |
|---|---|---|---|---|---|---|---|---|---|---|---|---|---|
| | | | | | | | Relative Sensitivity | Fog | Relative Sensitivity | Fog | Relative Sensitivity | Fog | |
| 1 | (I-7) | 2 | (III-1) | 16 | | | 151 | 0.05 | 190 | 0.06 | 126 | 0.05 | 83 |
| 2 | | 4 | | 16 | | | 158 | 0.05 | 190 | 0.06 | 138 | 0.05 | 87 |
| 3 | Dye A for | 2 | (III-1) | 16 | | | 100 | 0.05 | 114 | 0.09 | 71 | 0.05 | 71 |
| 4 | comparison | 4 | | 16 | | | 115 | 0.05 | 129 | 0.09 | 80 | 0.05 | 70 |
| 5 | (I-7) | 2 | (III-16) | 16 | | | 151 | 0.05 | 199 | 0.06 | 139 | 0.05 | 91 |
| 6 | | 4 | | 16 | | | 158 | 0.05 | 208 | 0.06 | 141 | 0.05 | 89 |
| 7 | (I-7) | 2 | (III-16) | 16 | (IV-1) | 1 | 186 | 0.05 | 240 | 0.06 | 173 | 0.05 | 93 |
| 8 | | 4 | | 16 | | 2 | 195 | 0.05 | 257 | 0.06 | 178 | 0.05 | 91 |
| 9 | (I-22) | 4 | (III-4) | 16 | | | 138 | 0.05 | 168 | 0.06 | 122 | 0.05 | 88 |
| 10 | | 8 | | 16 | | | 182 | 0.05 | 214 | 0.06 | 166 | 0.05 | 91 |
| 11 | (I-22) | 2 | (III-4) | 16 | (IV-4) | 1 | 158 | 0.05 | 190 | 0.06 | 146 | 0.05 | 92 |
| 12 | | 4 | | 16 | | 2 | 166 | 0.05 | 208 | 0.06 | 151 | 0.05 | 91 |

Chemical structure of sensitizing dye used for comparison:

C. and suffered minimal degradation of sensitivity under the conditions of 75% RH and 50° C.

EXAMPLE 3

Into silver halide emulsion as was used in Example 1 there were incorporated various sensitizing dyes in the same manner as in Example 1, then the resultant emulsions were applied to a support, and dried to produce test light-sensitive materials. One piece of each test film was left standing for 3 months under the conditions of 60% of relative humidity at 20° C. The test film was exposed to light, developed, and tested for change of sensitivity and fog in the same manner as in Example 1. The results are shown in relative values in Table 3.

TABLE 3

| Test No. | Sensitizing Dyes and Amounts of Use ($\times 10^{-5}$ mol/1 kg of emulsion) | | | | | | Immediately after Application (a) | | After 3 Months' Standing (b) | | Retention of Sensitivity upon Aging (b/a × 100) (%) |
|---|---|---|---|---|---|---|---|---|---|---|---|
| | | | | | | | Relative Sensitivity | Fog | Relative Sensitivity | Fog | |
| 1 | (I-3) | 2 | (III-3) | 16 | | | 110 | 0.05 | 106 | 0.05 | 96 |
| 2 | | 4 | | 16 | | | 123 | 0.05 | 118 | 0.05 | 96 |
| Comparative 3 Experiment | | | (III-3) | 16 | (IV-2) | 2 | 120 | 0.05 | 95 | 0.08 | 79 |
| Comparative 4 Experiment | | | | 16 | | 4 | 100 | 0.05 | 74 | 0.09 | 74 |
| 5 | (I-3) | 2 | (III-3) | 16 | (IV-4) | 2 | 132 | 0.05 | 123 | 0.05 | 93 |
| 6 | (I-23) | 4 | (III-1) | 16 | (III-9) | 2 | 118 | 0.05 | 118 | 0.05 | 100 |
| 7 | | 4 | | 16 | | 4 | 123 | 0.05 | 120 | 0.05 | 98 |
| 8 | (I-1) | 4 | (III-8) | 16 | (III-3) | 2 | 115 | 0.05 | 110 | 0.05 | 96 |
| 9 | | 4 | | 16 | | 4 | 126 | 0.05 | 120 | 0.05 | 98 |
| 10 | (I-23) | 2 | (III-16) | 16 | | | 105 | 0.05 | 103 | 0.05 | 98 |
| 11 | | 4 | | 16 | | | 115 | 0.05 | 107 | 0.05 | 93 |
| Comparative 12 Experiment | | | (III-9) | 16 | (IV-6) | 2 | 158 | 0.05 | 122 | 0.09 | 77 |
| Comparative 13 Experiment | | | | 16 | | 4 | 170 | 0.05 | 128 | 0.12 | 75 |

It is noted from Table 3 that the sensitizing dyes of the present invention suffered only minimal loss of sensitivity upon aging and showed no increase of fog. These results show that use of sensitizing dyes of the present invention permits provision of light-sensitive materials excelling in stability to withstand the adverse influences of aging.

EXAMPLE 4

A silver iodobromide emulsion (average particle size: 1.0μ, iodine content: 6 mol%, silver content: 80 g/kg of emulsion, and gelatin content: 60 g/kg of emulsion) chemically sensitized with gold and sulfur was combined with a stated amount of methanol solution of various sensitizing dyes to effect spectral sensitization.

This emulsion and an emulsion of magenta coupler, i.e., 1-(2,4,6-trichlorophenyl)-3-[3-(2,4-di-t-aminophenoxyacetamido)benzamido]-5-pyrazolone, were simultaneously applied to a cellulose triacetate film (at an application rate of 1.1 g/m² in terms of silver weight) and dried.

With a sensitometer having a light source of color temperature 4,800° K., the test film thus obtained was exposed to the light through a blue filter and a neutral gray wedge for sensitometry. Another piece of the same test film was similarly exposed to the light through a yellow filter in place of the blue filter.

After the exposure, the test film was subjected to the following reversal processing to obtain a magenta color image.

The steps involved in the processing and the processing solutions used therefor are shown below.

| Step of Processing | | |
|---|---|---|
| Step | Time (min) | Temperature (°C.) |
| First Development | 6 | 38 |
| Washing with Water | 2 | 38 |
| Reversion | 2 | 38 |
| Color Development | 6 | 38 |
| Adjustment | 2 | 38 |
| Bleaching | 6 | 38 |
| Fixation | 4 | 38 |
| Washing with Water | 4 | 38 |
| Stabilization | 1 | Room Temperature |

| Step of Processing | |
|---|---|
| Drying | |
| First Developing Bath | |
| Water | 700 ml |
| Sodium Tetrapolyphosphate | 2 g |
| Sodium Sulfite | 20 g |
| Hydroquinone-Monosulfonate | 30 g |
| Sodium Carbonate (monohydrate) | 30 g |
| 1-Phenyl-4-methyl-4-hydroxymethyl-3-pyrazolidone | 2 g |
| Potassium Bromide | 2.5 g |
| Potassium Thiocyanate | 1.2 g |
| Potassium Iodide (0.1% solution) | 2 ml |
| Water to make | 1.0 l |
| Reversal Bath | |
| Water | 700 ml |
| Hexasodium Nitril-N,N,N—trimethylenesulfonate | 3 g |
| Stannous Chloride (dihydrate) | 1 g |
| p-Aminophenol | 0.1 g |
| Sodium Hydroxide | 8 g |
| Glacial Acetic Acid | 15 ml |
| Water to make | 1.0 l |
| Color Developing Bath | |
| Water | 700 ml |
| Sodium Tetrapolyphosphate | 2 g |
| Sodium Sulfite | 7 g |
| Trisodium Phosphate (dodecahydrate) | 36 g |
| Potassium Bromide | 1 g |
| Potassium iodide (0.1% solution) | 90 ml |
| Sodium Hydroxide | 3 g |
| Citrazinic Acid | 1.5 g |
| N—Ethyl-N—(β-sulfoamidoethyl)-3-methylaminoaniline Sulfate | 11 g |
| Ethylenediamine | 3 g |
| Water to make | 1.0 l |
| Adjusting Bath | |
| Water | 700 ml |
| Sodium Sulfite | 12 g |
| Sodium Ethylenediaminetetraacetate (dihydrate) | 8 g |
| Thioglycerin | 0.4 ml |
| Glacial Acetic Acid | 3 ml |
| Water to make | 1.0 l |
| Bleaching Bath | |
| Water | 800 ml |
| Sodium Ethylenediaminetetraacetate (dihydrate) | 2.0 g |
| Iron (II) Ammonium Ethylenediaminetetraacetate (dihydrate) | 120.0 g |
| Potassium Bromide | 100.0 g |
| Water to make | 1.0 l |
| Fixing Bath | |
| Water | 800 ml |

-continued

| Step of Processing | |
|---|---|
| Ammonium Thiosulfate | 80.0 g |
| Sodium Sulfite | 5.0 g |
| Sodium Hydrogensulfite | 5.0 g |
| Water to make | 1.0 l |
| Stabilizing Bath | |
| Water | 800 ml |
| Formalin (37 wt %) | 5.0 ml |
| Fuji Driwel | 5.0 ml |
| Water to make | 1.0 l |

The magenta color image obtained on the resultant test material was tested for optical density. The reciprocal of the amount of exposure required to give a fixed magenta density (D=0.5) was reported as the sensitivity of the test material.

The results are shown in Table 4.

TABLE 4

| Test No. | Sensitizing Dyes and Amounts Used ($\times 10^{-5}$ mol/kg of emulsion) | | B Sensitivity (blue filter) | −B Sensitivity (yellow filter) |
|---|---|---|---|---|
| 1 | Dye (III-1) | 21.6 | 1.37 | 2.05 |
| 2 | Dye (III-1) | 21.6 | 1.38 | 2.28 |
|   | Dye (I-3) | 9.0 | | |

It is noted that the test material which used Dye (I-3) and Dye (III-1) in combination showed higher -B sensitivity than the test material which used Dye (III-1) alone. These results imply that combined use of Dye (I-3) and Dye (III-1) is effective in enhancing supersensitization.

EXAMPLE 5

Into silver iodobromide emulsion as was used in Example 4 there were incorporated various sensitizing dyes indicated in Table 5 in conjunction with Dye (III-1) in the same manner as in Example 4. The resulting emulsions were applied to a support and dried in the same manner as in Example 4. The test materials consequently obtained were left standing for 3 days under various combinations of relative humidities and temperatures as indicated in Table 5. The test films thus obtained were exposed, developed and tested for change of maximum density in the same manner as in Example 4.

The results are shown in Table 5.

TABLE 5

| Test No. | Sensitizing Dyes and Amounts Used ($\times 10^{-5}$ mol/kg of emulsion) | | Loss of Maximum Density Relative to Fresh | |
|---|---|---|---|---|
| | | | 3 Days at 55° C. and 30% RH (%) | 3 Days at 60° C. and 60% RH (%) |
| 1 | Dye (III-1) | 21.6 | 32.6 | 55.8 |
|   | Dye (I-3)   | 9.0  |      |      |
| 2 | Dye (III-1) | 21.6 | 37.0 | 66.7 |
|   | Dye (I-2)   | 9.0  |      |      |
| 3 | Dye (III-1) | 21.6 | 27.9 | 46.5 |
|   | Dye (I-23)  | 9.0  |      |      |
| 4 | Dye (III-1) | 21.6 | 18.8 | 36.3 |
|   | Dye (I-7)   | 9.0  |      |      |
| Comparative Experiment 5 | Dye (III-1) | 21.6 | 38.4 | 75.6 |
|   | Dye (IV-15) | 9.0  |      |      |

From the results of Table 5, it is noted that the combinations, No. 1 to No. 4, of sensitizing dyes conforming to this invention showed minimal loss of maximum density under the conditions of 3 days standing at 55° C. and 30% RH, and under the conditions of 3 days standing at 60° C. and 60% RH.

EXAMPLE 6

The same test materials as used in Example 5 were exposed to light in the same manner as in Example 5, and then left standing for 3 days under various conditions of relative humidity and temperature indicated in Table 6. The test materials were developed in the same manner as in Example 5. The highlight portion (density 0.2) of the test materials consequently obtained were tested for change of sensitivity. The results are shown in Table 6.

TABLE 6

| Test No. | Sensitizing Dyes and Amounts Used ($\times 10^{-5}$ mol/kg of emulsion) | | Loss of Sensitivity, $\Delta S_{0.2}$ Relative to Fresh | |
|---|---|---|---|---|
| | | | 3 Days at 50° C. and 30% RH | 3 Days at 45° C. and 80% RH |
| 1 | Dye (III-1) | 21.6 | 0.27 | 0.37 |
|   | Dye (I-3)   | 9.0  |      |      |
| 2 | Dye (III-1) | 21.6 | 0.20 | 0.20 |
|   | Dye (I-2)   | 9.0  |      |      |
| 3 | Dye (III-1) | 21.6 | 0.04 | 0.11 |
|   | Dye (I-23)  | 9.0  |      |      |
| 4 | Dye (III-1) | 21.6 | 0.17 | 0.24 |
|   | Dye (I-7)   | 9.0  |      |      |
| Comparative Experiment 5 | Dye (III-1) | 21.6 | 0.37 | 0.42 |
|   | Dye (IV-15) | 9.0  |      |      |

From the results of Table 6, it is noted that the combinations, No. 1 to No. 4, of sensitizing dyes conforming to the present invention showed minimal loss of sensitivity of highlight portion under the conditions of 3 days standing at 50° C. and 30% RH and under the conditions of 3 days standing at 45° C. and 80% RH.

EXAMPLE 7

On transparent polyethylene terephthalate supports, the following layers were superposed in the order listed to produce Light-Sensitive Elements 1 to 5.

(1) A mordant layer containing a polymer (3.0 g/m$^2$), i.e., a copolymer disclosed in U.S. Pat. No. 3,898,088 and having the following recurring units in the proportion indicated below:

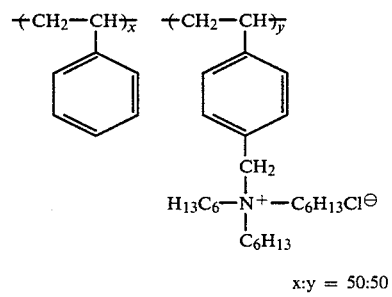

x:y = 50:50 and gelatin (3.0 g/m$^2$).

(2) A white color reflecting layer containing titanium oxide (20 g/m$^2$) and gelatin (2.0 g/m$^2$).

(3) A light shielding layer containing carbon black (2.7 g/m$^2$) and gelatin (2.7 g/m$^2$).

(4) A layer containing a cyan DRR compound indicated below (0.5 g/m²), diethyl laurylamide (0.25 g/m²), and gelatin (1.14 g/m²).

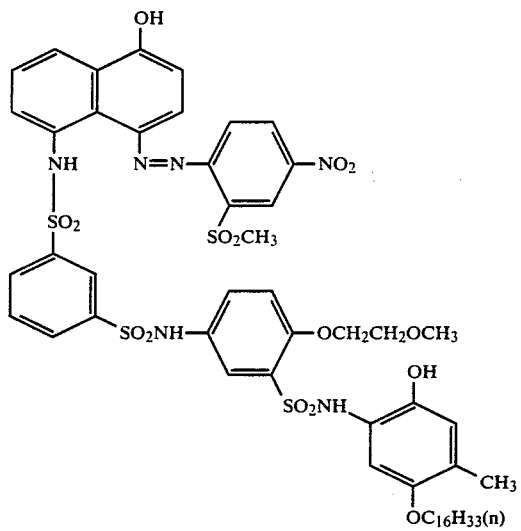

(5) A red-sensitive inner latent image type direct positive silver bromide emulsion layer containing an inner latent image type emulsion (1.9 g/m² in weight of silver), a red-sensitive sensitizing dye, namely, a fogging agent described afterward (0.07 mg/m²), and sodium 5-pentadecylhydroquinone-2-sulfonate (0.13 g/m²).

(6) A layer containing gelatin (2.6 g/m²) and 2,5-dioctyl hydroquinone (1.0 g/m²).

(7) A layer containing a magenta DRR compound indicated below (0.45 g/m²), diethyl laurylamide (0.10 g/m²), 2,5-di-t-butylhydroquinone (0.0074 g/m²), and gelatin (0.76 g/m²).

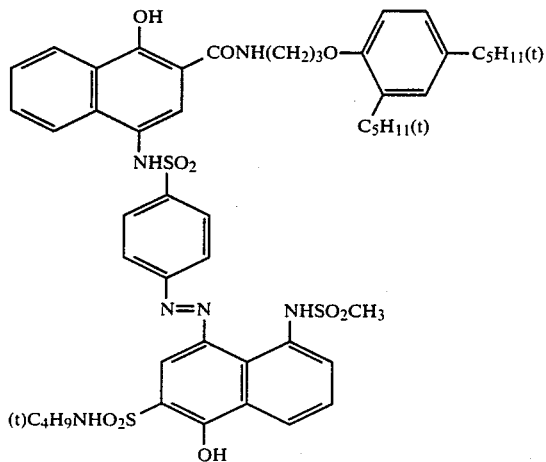

(8) A green-sensitive inner latent image type direct positive silver bromide emulsion layer containing an inner latent image type emulsion (1.4 g/m² in weight of silver) plus green-sensitive Sensitizing Dye (III-3) in the case of Light-Sensitive Element 1, plus green-sensitive Sensitizing Dyes (III-3) and (IV-15) in the case of Light-Sensitive Element 2, plus green-sensitive Sensitizing Dyes (III-3) and (I-3) in the case of Light-Sensitive Element 3, plus green-sensitive Sensitizing Dyes (III-3) and (I-28) in the case of Light-Sensitive Element 4, or plus green-sensitive Sensitizing Dyes (III-3) and (I-23) in the case of Light-Sensitive Element 5, respectively, the aforementioned fogging agent (0.05 mg/m²), and sodium 5-pentadecylhydroquinone-2-sulfonate (0.11 g/m²).

(9) A layer of the same composition as the layer of (6) above.

(10) A layer containing a yellow DRR compound indicated below (0.78 g/m²), diethyl laurylamide (0.16 g/m²), 2,5-di-t-butylhydroquinone (0.012 g/m²), and gelatin (0.78 g/m²).

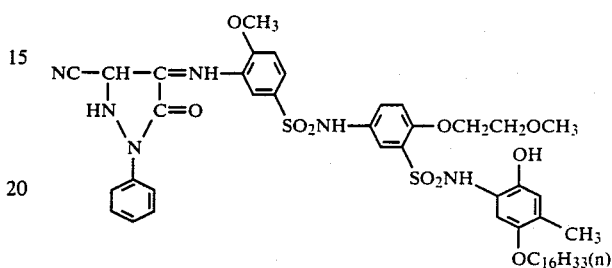

(11) A layer of blue-sensitive inner latent image type direct positive silver bromide emulsion containing an inner latent image type emulsion (2.2 g/m² in weight of silver), a blue-sensitive sensitizing dye, namely, a fogging agent indicated below (0.08 mg/m²), and sodium 5-pentadecylhydroquinone-2-sulfonate (0.094 g/m²).

Fogging Agent

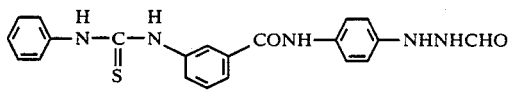

(12) A layer containing gelatin (0.94 g/m²).

The aforementioned Light-Sensitive Elements, No. 1 to No. 5, were processed in combination with each of the elements indicated below.

| Processing Solution | |
|---|---|
| 1-Phenyl-4-methyl-4-hydroxymethyl-3-pyrazolidinone | 10 g |
| Methyl Hydroquinone | 0.18 g |
| 5-Methylbenzotriazole | 4.0 g |
| Sodium Sulfite (anhydrous) | 1.0 g |
| Na Salt of Carboxymethyl Cellulose | 40.0 g |
| Carbon Black | 150 g |
| Potassium Hydroxide (28% aq. soln.) | 200 cc |
| Water | 550 cc |

The processing solution of the composition shown above was placed, in portions of 0.8 g, to fill up containers rupturable under pressure (pods).

Cover Sheet

A cover sheet was produced by superposing on a polyethylene terephthalate support an acidic polymer layer (neutralizing layer) containing polyacrylic acid (aqueous 10 wt% solution having a density of about 1,000 cp) (15 g/m²) and a neutralization timing layer containing acetyl cellulose (produced by hydrolyzing 100 g of acetyl cellulose to an extent of forming 39.4 g of acetyl group) (3.8 g/m²) and a styrene-maleic anhydride copolymer (having a styrene-maleic anhydride molar ratio of about 60:40 and a molecular weight of about 50,000) (0.2 g/m²).

The Light-Sensitive Elements, No. 1 through No. 5, were each superposed on this cover sheet, left standing for 3 months at 40° C., then subjected to optical wedge exposure using a sensitometer having a light source of color temperature 5,400° K., and subjected to the following treatment.

Step of Processing

The aforementioned cover sheet and the aforementioned light-sensitive sheet were superposed and exposed to the light through a color test chart placed on the cover sheet side. Then, the aforementioned processing solution was spread to a thickness of 75μ between the two sheets (with the aid of a press roller). The processing was carried out at 25° C. One hour after the processing, the green density of the image formed in the image receiving layer was measured through the transparent support of the light-sensitive sheet with a Macbeth reflection densitometer. The results are shown in Table 7.

TABLE 7

| Light-Sensitive Element | Sensitizing Dyes and Amounts Used (× mg/m²) | Relative Sensitivity Immediately after Application (a) | Relative Sensitivity after 3 Months Standing at 40° C. (b) | Retention of Sensitivity upon Aging (b/a × 100) (%) |
|---|---|---|---|---|
| 1 (Comparison) | (III-3) 1.3 | 100 | 95 | 95 |
| 2 (Comparison) | (III-3) 1.3 + (IV-15) 1.3 | 130 | 82 | 63 |
| 3 | (III-3) 1.3 + (I-3) 1.3 | 127 | 117 | 92 |
| 4 | (III-3) 1.3 + (I-28) 1.3 | 134 | 121 | 90 |
| 5 | (III-3) 1.3 + (I-23) 1.3 | 129 | 123 | 95 |

*The standard point of optical density used for determination of sensitivity was fixed at (minimum density ÷ 0.5).

From Table 7, it is noted that the systems involving combined use of sensitizing dyes in accordance with the present invention showed increased sensitivity and suffered only minimal loss of sensitivity under the influence of aging.

EXAMPLE 8

A silver iodobromide (iodine content: 8 mol%) emulsion was obtained by causing formation of silver halide particles by the single jet method and allowed the precipitated particles to undergo physical aging, desalting processing, and chemical aging. The silver halide particles contained in this emulsion had an average diameter of 0.8 micron. This emulsion contained 0.6 mol of silver halide per kg.

In a pot, 1 kg of the emulsion was dissolved by heating. Methanol solutions of various sensitizing dyes in the amount indicated in Table 1 were added to and stirred with the dissolved emulsions. The resultant mixture and 12 ml of an aqueous 1.0 wt% 4-hydroxy-6-methyl-1,3,3a,7-tetraazaindene solution, 10 ml of an aqueous 1.0 wt% 1-hydroxy-3,5-dichlorotriazine sodium salt solution, and 10 ml of an aqueous 1.0 wt% sodium dodecylbenzenesulfonate added thereto in the order mentioned were stirred. The finished emulsion thus obtained was coated on a polyethylene terephthalate film base in a thickness to give dry film 5 microns in thickness and then dried. Consequently, there was obtained a test piece of light-sensitive material. With a sensitometer having a light source of color temperature 5,400° K., the test film was subjected to optical wedge exposure, using SC-50 filter, which is produced by Fuji Photo Film Co., Ltd., is a yellow filter and can transmit only light of wavelengths not shorter than 500 nm, that is, in this case this filter can transmit only light of wavelength band which is spectrally sensitized by dye, attached to the light source.

After the exposure, the test film was developed with the developer of the same composition as used in Example 1 at 20° C. for 7 minutes, processed to stop the development, processed in a fixing bath, and washed with water, to afford a strip containing prescribed monochromic images. This strip was tested for density to find data on sensitivity and fog. The standard point for optical density used for the determination of sensitivity was fixed at fog+0.20.

The results are shown in relative values in Table 8. From the results, it is noted that the combination of materials conforming to this invention resulted in production of a light-sensitive material having high sensitivity and involving minimal fog.

TABLE 8

| Test No. | Sensitizing Dyes and Amounts of Use (× 10⁻⁵ mol/kg of emulsion) | | | | | | Relative Sensitivity | Fog |
|---|---|---|---|---|---|---|---|---|
| 1 | (II-1) | 4 | | | | | 100 | 0.05 |
| 2 | | 8 | | | | | 141 | 0.05 |
| 3 | | 16 | | | | | 190 | 0.05 |
| 4 | | 32 | | | | | 126 | 0.06 |
| 5 | | | (III-1) | 16 | | | 195 | 0.05 |
| 6 | | | | 32 | | | 240 | 0.05 |
| 7 | | | | 64 | | | 120 | 0.06 |
| 8 | (II-1) | 2 | (III-1) | 32 | | | 316 | 0.05 |
| 9 | | 4 | | 32 | | | 330 | 0.05 |
| 10 | (II-2) | 2 | (III-1) | 32 | (IV-5) | 2 | 354 | 0.05 |
| 11 | | | (III-3) | 8 | | | 195 | 0.05 |
| 12 | | | | 16 | | | 234 | 0.05 |
| 13 | | | | 32 | | | 94 | 0.08 |
| 14 | (II-1) | 2 | (III-3) | 16 | | | 324 | 0.05 |
| 15 | | 4 | | 16 | | | 338 | 0.05 |
| 16 | | | | | (IV-6) | 8 | 190 | 0.05 |
| 17 | | | | | | 16 | 251 | 0.05 |
| 18 | | | | | | 32 | 74 | 0.07 |
| 19 | (II-1) | 16 | | | (IV-6) | 8 | 347 | 0.05 |
| 20 | | 8 | | | | 16 | 355 | 0.05 |
| 21 | (II-7) | 4 | | | | | 105 | 0.05 |
| 22 | | 8 | | | | | 177 | 0.05 |
| 23 | | 16 | | | | | 219 | 0.05 |
| 24 | | 32 | | | | | 199 | 0.06 |
| 25 | | | (III-11) | 8 | | | 162 | 0.05 |
| 26 | | | | 16 | | | 209 | 0.05 |
| 27 | | | | 32 | | | 65 | 0.07 |
| 28 | (II-7) | 16 | (III-11) | 8 | | | 316 | 0.05 |
| 29 | | 16 | | 16 | | | 324 | 0.05 |
| 30 | | | | | (IV-1) | 8 | 182 | 0.05 |
| 31 | | | | | | 16 | 246 | 0.05 |
| 32 | | | | | | 32 | 97 | 0.07 |
| 33 | (II-7) | 8 | | | (IV-1) | 8 | 316 | 0.05 |

TABLE 8-continued

| Test No. | Sensitizing Dyes and Amounts of Use ($\times 10^{-5}$ mol/kg of emulsion) | | Relative Sensitivity | Fog |
|---|---|---|---|---|
| 34 | 8 | | 16 | 338 | 0.05 |

EXAMPLE 9

Into silver halide emulsion as was used in Example 8 there were incorporated various sensitizing dyes in the same manner as in Example 8, then the resultant emulsions were applied to a support, and dried to produce test light-sensitive materials. One piece of each test film was left standing for 3 days under the conditions of 75% of relative humidity and 50° C. of temperature. Another piece of the test film was left standing for 3 days under the conditions of 20% of relative humidity at 50° C. These pieces of test film were exposed, developed, and tested for change of sensitivity and fog in the same manner as in Example 8. The results are shown in relative values in Table 9.

TABLE 9

| Test No. | Sensitizing Dyes and Amounts of Use ($\times 10^{-5}$ mol/kg of emulsion) | | | | | | 3 Days at 60% RH, 20° C. Relative Sensitivity (a) | Fog | 3 Days at 20% RH, 50° C. Relative Sensitivity | Fog | 3 Days at 75% RH, 50° C. Relative Sensitivity (b) | Fog | Retention of Sensitivity under Conditions of High Temperature and High Humidity (b/a 100) (%) |
|---|---|---|---|---|---|---|---|---|---|---|---|---|---|
| 1 | (II-3) | 2 | (III-4) | 16 | | | 158 | 0.05 | 208 | 0.06 | 134 | 0.05 | 85 |
| 2 | | 4 | | 16 | | | 170 | 0.05 | 214 | 0.06 | 151 | 0.05 | 89 |
| 3 | (II-22) | 16 | (III-9) | 2 | | | 170 | 0.05 | 224 | 0.06 | 155 | 0.05 | 91 |
| 4 | | 16 | | 4 | | | 174 | 0.05 | 214 | 0.06 | 155 | 0.05 | 89 |
| 5 | (II-3) | 16 | | | (IV-9) | 4 | 186 | 0.05 | 224 | 0.06 | 162 | 0.05 | 87 |
| 6 | | 16 | | | | 8 | 186 | 0.05 | 229 | 0.06 | 166 | 0.05 | 89 |
| 7 | (II-25) | 2 | (III-15) | 16 | | | 151 | 0.05 | 204 | 0.06 | 130 | 0.05 | 86 |
| 8 | | 4 | | 16 | | | 162 | 0.05 | 200 | 0.06 | 134 | 0.05 | 83 |
| 9 | (II-5) | 16 | | | (IV-7) | 4 | 145 | 0.05 | 195 | 0.06 | 133 | 0.05 | 92 |
| 10 | | 16 | | | | 8 | 155 | 0.05 | 204 | 0.06 | 147 | 0.05 | 95 |
| 11 | Dye A for | 2 | (III-4) | 16 | | | 100 | 0.05 | 112 | 0.09 | 72 | 0.05 | 72 |
| 12 | Comparison | 4 | | 16 | | | 110 | 0.05 | 120 | 0.10 | 76 | 0.05 | 69 |
| 13 | | 8 | | 16 | | | 107 | 0.05 | 100 | 0.14 | 74 | 0.06 | 69 |

The chemical structure of the sensitizing dye used for comparison is the same as that of Dye A for comparison in Example 2.

From the results given in Table 9, it is clear that the sensitizing dyes of this invention showed only sparing increase in fog under the conditions of low humidity and high temperature and suffered minimal degradation of sensitivity under the conditions of high humidity and high temperature.

EXAMPLE 10

Into silver halide emulsion as was used in Example 1 there were incorporated various sensitizing dyes in the same manner as in Example 8, then the resultant emulsions were applied to a support, and dried to produce test light-sensitive materials. One piece of the test film was left standing for 3 months under the conditions of 60% of relative humidity and 20° C. of temperature. The test film was exposed to light, developed, and tested for change of sensitivity and fog in the same manner as in Example 8. The thus obtained results are calculated according to the following manner and the results are shown in Table 10.

$$\text{Retention of Sensitivity} = \frac{\text{Sensitivity after 3 months standing}}{\text{Sensitivity immediately after application}} \times 100\ (\%)$$

$$\text{Change in fog} = \begin{pmatrix} \text{Fog after} \\ \text{3 months} \\ \text{standing} \end{pmatrix} - \begin{pmatrix} \text{Fog immediately} \\ \text{after application} \end{pmatrix}$$

TABLE 10

| Test No. | Sensitizing Dyes and Amounts of Use ($\times 10^{-5}$ mol/kg of emulsion) | | | | Retention of Sensitivity (%) | Change in Fog |
|---|---|---|---|---|---|---|
| 1 | (II-16) | 4 | (III-6) | 16 | 98 | 0 |
| 2 | Dye B for Comparison | 4 | (III-6) | 16 | 71 | +0.04 |
| 3 | (II-21) | 4 | (III-4) | 16 | 96 | 0 |
| 4 | (II-21) | 12 | (IV-10) | 8 | 93 | +0.01 |
| 5 | Dye B for Comparison | 12 | (IV-10) | 8 | 74 | +0.06 |
| 6 | (II-24) | 4 | (III-4) 16 | | 100 | 0 |
| 7 | (II-27) | 16 | (III-9) 4 | | 98 | +0.01 |
| 8 | (II-27) | 16 | (IV-2) | 4 | 96 | 0 |
| 9 | (II-2) | 12 | (IV-3) | 8 | 96 | +0.01 |
| 10 | (II-2) | 12 | Dye C for comparison | 8 | 74 | +0.04 |

The chemical structures of the dyes used for comparison are as follows:

Dye B for Comparison

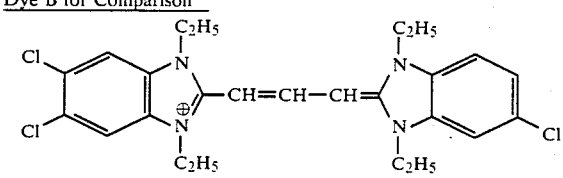

Dye C for Comparison

-continued

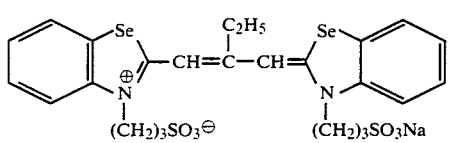

It is noted from Table 10 that the sensitizing dyes of the present invention suffered only minimal loss of sensitivity upon aging and showed no increase or little increase of fog. These results imply that use of sensitizing dyes of the present invention permits provision of light-sensitive materials excelling in stability to withstand the influence of aging.

EXAMPLE 11

A test film was obtained in the same manner as in Example 4, except for adding various sensitizing dyes in amounts as indicated in Table 11, instead of adding the various sensitizing dyes as indicated in Table 4 in Example 4. The test film was subjected to the same processing as in Example 4 to obtain a magenta color image.

The magenta color image obtained on the resultant test material was tested for optical density. The reciprocal of the amount of exposure required to give a fixed magenta density (D=0.5) was reported as the sensitivity of the test material.

The results are shown in Table 11.

TABLE 11

| Test No. | Sensitizing Dyes and Amounts Used ($\times 10^{-5}$ mol/kg of emulsion) | | B Sensitivity (blue filter) | −B sensitivity (yellow filter) |
|---|---|---|---|---|
| 1 | Dye (III-1) | 21.6 | 1.37 | 2.05 |
| 2 | Dye (III-1) Dye (II-1) | 21.6 9.0 | 1.38 | 2.29 |
| 3 | Dye (III-1) Dye (II-3) | 21.6 9.0 | 1.37 | 2.28 |
| 4 | Dye (III-1) Dye (II-7) | 21.6 9.0 | 1.35 | 2.26 |
| 5 | Dye (III-1) Dye (II-23) | 21.6 9.0 | 1.36 | 2.30 |

It is noted that the test material which used the dye of the present invention and Dye (III-1) in combination showed higher-B sensitivity than the test material which used Dye (III-1) alone. These results imply that combined use of the dye of the present invention and Dye (III-1) is effective in enhancing supersensitization.

EXAMPLE 12

Into silver iodobromide emulsion as was used in Example 4 there were incorporated various sensitizing dyes indicated in Table 12 in conjunction with Dye (III-1) in the same manner as in Example 4. The resulting emulsion was applied to a support and dried in the same manner as in Example 4. The test material consequently obtained was left standing for 3 days under various combinations of relative humidities and temperatures as indicated in Table 12. The test film thus obtained was exposed, developed, and tested for change of maximum density in the same manner as in Example 4.

The results are shown in Table 12.

TABLE 12

| Test No. | Sensitizing Dyes and Amounts Used ($\times 10^{-5}$ mol/kg of emulsion) | | Loss of Maximum Density Relative to Fresh | |
|---|---|---|---|---|
| | | | 3 Days at 55° C. and 30% RH (%) | 3 Days at 60° C. and 60% RH (%) |
| 1 | (III-1) 21.6 + (II-1) | 9.0 | 32.9 | 67.5 |
| 2 | (III-1) 21.6 + (II-3) | 9.0 | 22.2 | 63.3 |
| 3 | (III-1) 21.6 + (II-7) | 9.0 | 16.6 | 51.5 |
| 4 | (III-1) 21.6 + (II-23) | 9.0 | 18.5 | 56.6 |
| Comparative Experiment 5 | (III-1) 21.6 + (IV-15) | 9.0 | 38.4 | 75.6 |

From the results of Table 12, it is noted that the combinations, No. 1 to No. 4, of sensitizing dyes conforming to this invention showed minimal loss of maximum density under the conditions of 3 days standing at 55° C. and 30% RH and under the conditions of 3 days standing at 60° C. and 60% RH.

EXAMPLE 13

The same test materials as used in Example 12 were exposed to light in the same manner as in Example 4 and then left standing for 3 days under various conditions of relative humidity and temperature indicated in Table 13. The test materials were developed in the same manner as in Example 4. The highlight portion (density 0.2) of the test material consequently obtained was tested for change of sensitivity. The results are shown in Table 13.

TABLE 13

| Test No. | Sensitizing Dyes and Amounts Used ($\times 10^{-5}$ mol/kg of emulsion) | | Loss of Sensitivity, $\Delta S_{0.2}$ relative to Fresh | |
|---|---|---|---|---|
| | | | 3 Days at 50° C. and 30% RH | 3 Days at 45° C. and 80% RH |
| 1 | (III-1) 21.6 + (II-1) | 9.0 | 0.27 | 0.28 |
| 2 | (III-1) 21.6 + (II-3) | 9.0 | 0.21 | 0.24 |
| 3 | (III-1) 21.6 + (II-7) | 9.0 | 0.15 | 0.17 |
| 4 | (III-1) 21.6 + (II-23) | 9.0 | 0.17 | 0.19 |
| Comparative Experiment 5 | (III-1) 21.6 + (IV-15) | 9.0 | 0.37 | 0.42 |

From the results of Table 13, it is noted that the combinations, No. 1 to No. 4, of sensitizing dyes conforming to the present invention showed minimal loss of sensitivity of highlight portion under the conditions of 3 days standing at 50° C. and 30% RH and under the conditions of 3 days standing at 45° C. and 80% RH.

EXAMPLE 14

Light-Sensitive Elements 1 to 5 were produced in the same manner as in Example 7 except that a green-sensitive inner latent image type direct positive silver bromide emulsion layer containing an inner latent image type emulsion (1.4 g/m² in weight of silver) plus green-sensitive Sensitizing Dye (III-3) in the case of Light-Sensitive Element 1, plus green-sensitive Sensitizing Dye (III-3) and Comparison Dye D in the case of Light-Sensitive Element 2, plus green-sensitive Sensitizing Dyes (III-3) and (II-1) in the case of Light-Sensitive Element 3, plus green-sensitive Sensitizing Dyes (II-3) and (I-23) in the case of Light-Sensitive Element 4, or plus green-sensitive Sensitizing Dyes (III-3) and (II-28)

in the case of Light-Sensitive Element 5, respectively, the aforementioned fogging agent (0.05 mg/m²) and sodium 5-pentadecylhydroquinone-2-sulfonate (0.11 g/m²) was used.

The aforementioned Light-Sensitive Elements, No. 1 to No. 5, were processed in combination with each of the same elements as in Example 7, in the same manner as in Example 7.

The results are shown in Table 14.

TABLE 14

| Light-Sensitive Element | Sensitizing Dyes and Amounts Used ($\times$ mg/m²) | Relative Sensitivity Immediately after Application (a) | Relative Sensitivity after 3 Months Standing at 40° C. (b) | Retention of Sensitivity upon Aging (b/a 100) (%) |
|---|---|---|---|---|
| 1 (Comparison) | (III-3) 1.3 | 100 | 96 | 96 |
| 2 (Comparison) | (III-3) 1.3 + Dye D for comparison 1.3 | 128 | 78 | 61 |
| 3 | (III-3) 1.3 + (II-1) 1.3 | 126 | 117 | 93 |
| 4 | (III-3) 1.3 + (II-23) 1.3 | 123 | 109 | 89 |
| 5 | (III-3) 1.3 + (II-28) 1.3 | 121 | 103 | 85 |

*The standard point of optical density used for determination of sensitivity was fixed at (minimum density + 0.5).

Dye D for Comparison

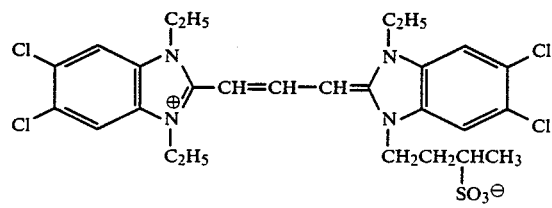

From Table 14, it is noted that the systems involving combined use of sensitizing dyes in accordance with the present invention showed increased sensitivity and suffered only minimal loss of sensitivity under the influence of aging.

While the invention has been described in detail and with reference to specific embodiments thereof, it will be apparent to one skilled in the art that various changes and modifications can be made therein without departing from the spirit and scope thereof.

What is claimed is:

1. A silver halide photographic emulsion containing in combination at least one dye represented by the following formulae (I) and (II) and at least one dye represented by the following formulae (III) and (IV):

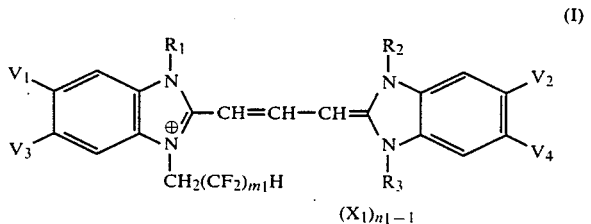

wherein $m_1$ is an integer having a value of 1 to 8, $R_1$, $R_2$ and $R_3$, which may be identical with or different from one another, independently represent a —$CH_2(CF_2)_{l_1}H$ group or a substituted or unsubstituted alkyl group, providing that at least one of $R_1$, $R_2$ and $R_3$ possesses an acid substituent (such as, for example, a sulfonic acid group or carboxylic acid group), $l_1$, which may be equal to or not equal to $m_1$, is an integer having a value of 1 to 8, $V_1$, $V_2$, $V_3$ and $V_4$, which may be identical with or different from one another, independently represent a hydrogen atom, a halogen atom, a substituted alkyl group, an unsubstituted alkyl group, an alkoxy group, an acyl group, an acyloxy group, an alkoxycarbonyl group, a carbamoyl group, a sulfamoyl group, a cyano group, or a trifluoromethyl group, $X_1$ represents an anion, and $n_1$ is 1 or 2, providing that $n_1$ where the dye forms an intramolecular salt;

(II)

$$V_5 \underset{V_6}{\overset{R_4}{\underset{|}{N}}} \overset{}{\underset{N}{\overset{\oplus}{\bigcirc}}} -CH=CH-CH= \underset{R_6}{\overset{R_5}{\underset{|}{N}}} \overset{V_7}{\underset{V_8}{\bigcirc}}$$

$$(CH_2)_{l_2}(CF_2)_{m_2}F$$

$$(X_2)_{n_2-1}$$

wherein $l_2$ is 0 or an integer having a value of 1 to 8, $m_2$ is 0 or an integer having a value of 1 to 8, providing that the total value of $l_2$ and $m_2$ is an integer greater than 0, $R_4$, $R_5$, and $R_6$, which may be identical with or different from one another, independently represent a —$(CH_2)_j(CF_2)_kF$ group or a substituted or unsubstituted alkyl group, providing that at least one of $R_4$, $R_5$ and $R_6$ represents an alkyl group containing an acid substituent (such as, for example, a sulfonic acid group or carboxylic acid group), $j$ is 0 or an integer having a value of 1 to 8, $k$ is 0 or an integer having a value of 1 to 8, providing that the total value of $j$ and $k$ is an integer greater than 0, $V_5$, $V_6$, $V_7$ and $V_8$, which may be identical with or different from one another, independently represent a hydrogen atom, a halogen atom, a substituted alkyl group, an unsubstituted alkyl group, an alkoxy group, an acyl group, an acyloxy group, an alkoxycarbonyl group, a carbamoyl group, a sulfamoyl group, a cyano group or a trifluoromethyl group, $X_2$ represents an anion, and $n_2$ is 1 or 2, providing that $n_2$ is 1 where the dye forms an intramolecular salt;

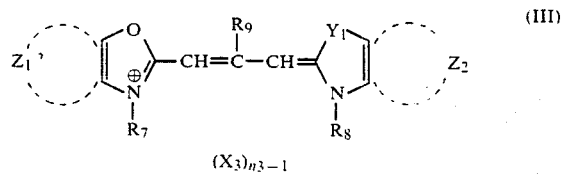

wherein $Y_1$ represents an oxygen atom, a sulfur atom, a selenium atom, or $N-R_{10}$, $Z_1$ and $Z_2$, which may be identical with or different from each other, independently represent an atomic group necessary for the formation of an unsubstituted or substituted benzene ring or naphthalene ring, $R_7$, $R_8$ and $R_{10}$ independently represent an unsubstituted or substituted alkyl group, providing that at least one of $R_7$, $R_8$ and $R_{10}$ possesses an acid substituent, $R_9$ represents a hydrogen atom, an alkyl group, or an aralkyl group, $X_3$ represents an anion, and $n_3$ is 1 or 2, providing than $n_3$ is 1 where the dye forms an intramolecular salt;

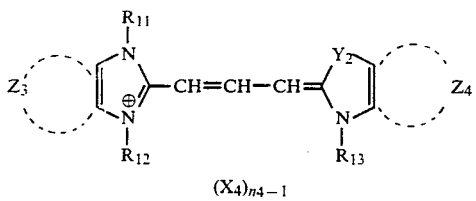

(IV)

$(X_4)_{n_4-1}$ wherein $Y_2$ represents a sulfur atom, a selenium atom, or $N-R_{14}$, $Z_3$ and $Z_4$, which may be identical with or different from each other, independently represent an atomic group necessary for the formation of a unsubstituted or substituted benzene ring or naphthalene ring, $R_{11}$, $R_{12}$, $R_{13}$ and $R_{14}$ independently represent an unsubstituted or substituted alkyl group, providing that at least one of $R_{11}$, $R_{12}$, $R_{13}$ and $R_{14}$ possesses an acid substituent, $X_4$ represents an anion, and $n_4$ is 1 or 2, providing that $n_4$ is 1 where the dye forms an intramolecular salt.

2. A silver halide photographic emulsion according to claim 1, which is a silver iodobromide emulsion.

3. A silver halide photographic emulsion according to claim 1, which is a silver bromide emulsion.

4. A silver halide photographic emulsion according to claim 1, wherein said silver halide photographic emulsion contains a color coupler.

5. A silver halide photographic emulsion according to claim 3, wherein said silver bromide emulsion contains a fogging agent.

6. A silver halide photographic emulsion according to claim 4, wherein said color coupler is a magenta coupler.

7. A silver halide photographic emulsion according to claim 1, wherein $V_3$ and $V_4$ of formula (I) independently represent a trifluoromethyl group, a chlorine atom, or a cyano group and $V_1$ and $V_2$ thereof each represents a chlorine atom.

8. A silver halide photographic emulsion according to claim 7, wherein either of $V_3$ and $V_4$ represents a trifluoromethyl group, a chlorine atom, or a cyano group and the other represents a chlorine atom.

9. A silver halide photographic emulsion according to claim 7, wherein either of $V_3$ and $V_4$ represents a trifluoromethyl group and the other represents a cyano group.

10. A silver halide photographic emulsion according to claim 1, wherein $V_6$ and $V_8$ of the formula (II) independently represent a trifluoromethyl group, a chlorine atom, or a cyano group and $V_5$ and $V_7$ thereof each represents a chlorine atom.

11. A silver halide photographic emulsion according to claim 10, wherein either of $V_6$ and $V_8$ represents a trifluoromethyl group, a chlorine atom, or a cyano group and the other represents a chlorine atom.

12. A silver halide photographic emulsion according to claim 10, wherein either of $V_6$ and $V_8$ represents a trifluoromethyl group and the other represents a cyano group.

13. A silver halide photographic emulsion according to claim 1, wherein $Y_1$ of formula (III) represents an oxygen atom and $Z_1$ and $Z_2$ thereof independently represent a benzene ring having a phenyl group, a chlorine atom, or a methoxy group substituted at the 5-position thereof.

14. A color photographic light-sensitive material according to claim 2, comprising at least a blue-sensitive emulsion layer, a green-sensitive emulsion layer, and a red-sensitive emulsion layer, wherein said green-sensitive emulsion layer is formed of said silver halide photographic emulsion according to claim 2.

15. A color photographic light-sensitive material according to claim 3, comprising at least a blue-sensitive emulsion layer, a green-sensitive emulsion layer, and a red-sensitive emulsion layer, wherein said green-sensitive emulsion layer is formed of said silver halide photographic emulsion according to claim 3.

16. A color photographic light-sensitive material according to claim 15, wherein said green-sensitive emulsion layer is an inner latent image type silver halide photographic light-sensitive material.

17. A color photographic light-sensitive material according to claim 16, wherein said photographic sensitive material is a silver halide photographic light-sensitive material obtained by a color diffusion transfer process.

18. A silver halide photographic emulsion according to claim 1, wherein the molar ratio of dye of formulae (III) and (IV) to dye of formulae (I) and (II) is in the range of from 1:20 to 10:1.

19. A silver halide photographic emulsion according to claim 1, wherein the molar ratio of dye of formulae (III) and (IV) to dye of formulae (I) and (II) is in the range of from 1:10 to 5:1.

20. A silver halide photographic emulsion according to claim 18, wherein the compounds of formulae (I), (II), (III) and (IV) are contained in a silver halide photographic emulsion in a combined amount of from $1 \times 10^{-6}$ mol to $5 \times 10^{-3}$ mol per mol of silver halide.

21. A silver halide photographic emulsion according to claim 18, wherein the compounds of formulae (I), (II), (III) and (IV) are contained in a silver halide photographic emulsion in a combined amount of from $1 \times 10^{-5}$ mol to $3 \times 10^{-3}$ mol per mol of silver halide.

* * * * *